(12) United States Patent
Walker et al.

(10) Patent No.: US 10,953,349 B2
(45) Date of Patent: Mar. 23, 2021

(54) DEGASSING ELECTRORHEOLOGICAL FLUID

(71) Applicant: NIKE, Inc., Beaverton, OR (US)

(72) Inventors: Steven H. Walker, Camas, WA (US); Raymond L. Nicoli, Seattle, WA (US); Katherine Stegner, Seattle, WA (US)

(73) Assignee: NIKE, Inc., Beaverton, OR (US)

( * ) Notice: Subject to any disclaimer, the term of this patent is extended or adjusted under 35 U.S.C. 154(b) by 152 days.

(21) Appl. No.: 16/118,884

(22) Filed: Aug. 31, 2018

(65) Prior Publication Data

US 2019/0060790 A1 Feb. 28, 2019

Related U.S. Application Data

(60) Provisional application No. 62/552,555, filed on Aug. 31, 2017.

(51) Int. Cl.
*B01D 19/00* (2006.01)
*A43B 13/20* (2006.01)
*A43B 13/18* (2006.01)
*C10M 171/00* (2006.01)
(Continued)

(52) U.S. Cl.
CPC ........ *B01D 19/0057* (2013.01); *A43B 13/189* (2013.01); *A43B 13/206* (2013.01); *B01D 19/0026* (2013.01); *B01D 19/0031* (2013.01); *B01D 19/0036* (2013.01); *B01D 19/0042* (2013.01); *B01D 19/0063* (2013.01); *B01D 19/0068* (2013.01); *B01D 19/0078* (2013.01);
(Continued)

(58) Field of Classification Search
CPC ............... B01D 19/00; B01D 19/0057; B01D 19/0031; B01D 19/0078
See application file for complete search history.

(56) References Cited

U.S. PATENT DOCUMENTS 2,472,754 A 6/1949 Mead
4,183,156 A 1/1980 Rudy
4,864,738 A 9/1989 Horovitz
(Continued)

FOREIGN PATENT DOCUMENTS

CN 101337593 A 1/2009
GB 2318529 A 4/1998
(Continued)

OTHER PUBLICATIONS

Nov. 23, 2018—(WO) ISR &WO—App. No. PCT/US18/048715.
(Continued)

*Primary Examiner* — Youngsul Jeong
(74) *Attorney, Agent, or Firm* — Banner & Witcoff, Ltd.

(57) ABSTRACT

A system may include an output manifold that may be in fluid communication with a reservoir and that may include multiple discharge ports. Each of the discharge ports may be configured to discharge electrorheological fluid into a housing. A recovery manifold may be in fluid communication with the reservoir and include multiple recovery ports. Each of the recovery ports may be configured to receive the electrorheological fluid from a housing. A gas remover may be positioned to extract gas from the electrorheological fluid received from the recovery ports. A housing may be connected to the system, and electrorheological fluid from the system may be pumped through the housing and the gas remover.

12 Claims, 35 Drawing Sheets

(51) Int. Cl.
*A43B 3/00* (2006.01)
*C10N 30/00* (2006.01)

(52) U.S. Cl.
CPC ....... *C10M 171/001* (2013.01); *A43B 3/0005* (2013.01); *C10N 2030/60* (2020.05)

(56) References Cited

U.S. PATENT DOCUMENTS

| | | | |
|---|---|---|---|
| 5,240,477 A | 8/1993 | Yamaga et al. | |
| 5,335,486 A | 8/1994 | Davis | |
| 5,788,078 A | 8/1998 | Fuss | |
| 6,277,306 B1 | 8/2001 | Endo et al. | |
| 6,378,558 B1 | 4/2002 | Pohl et al. | |
| 6,562,107 B2* | 5/2003 | Purdom | B01D 19/0031 210/188 |
| 6,725,888 B1 | 4/2004 | Richter et al. | |
| 6,837,919 B2* | 1/2005 | Asako | B01D 19/0036 188/267.1 |
| 7,093,710 B2* | 8/2006 | Shimizu | B41J 2/17533 206/213.1 |
| 7,156,201 B2 | 1/2007 | Peshkovskiy et al. | |
| 7,409,779 B2 | 8/2008 | Dojan et al. | |
| 8,651,230 B2 | 2/2014 | Peshkovsky et al. | |
| 9,142,751 B2 | 9/2015 | Peshkovsky et al. | |
| 2002/0053146 A1 | 5/2002 | Swigart | |
| 2006/0059714 A1 | 3/2006 | Harmon-Weiss et al. | |
| 2006/0157888 A1 | 7/2006 | Mata Diego | |
| 2006/0230636 A1 | 10/2006 | Kokstis et al. | |
| 2006/0248750 A1* | 11/2006 | Rosenberg | A43B 1/0054 36/29 |
| 2008/0138774 A1 | 6/2008 | Ahn et al. | |
| 2012/0138631 A1 | 6/2012 | Lurcott et al. | |
| 2012/0233880 A1 | 9/2012 | Chao et al. | |
| 2012/0255198 A1 | 10/2012 | Langvin et al. | |
| 2014/0020264 A1 | 1/2014 | Holt | |
| 2014/0173937 A1 | 6/2014 | Smith et al. | |
| 2014/0277632 A1 | 9/2014 | Walker | |
| 2016/0345663 A1 | 12/2016 | Walker et al. | |
| 2017/0150785 A1 | 6/2017 | Walker et al. | |

FOREIGN PATENT DOCUMENTS

| | | |
|---|---|---|
| JP | S52115803 A | 9/1977 |
| JP | S6393311 A | 4/1988 |
| JP | H05112793 A | 5/1993 |
| JP | 2004195982 A | 7/2004 |
| KR | 101311156 B1 | 9/2013 |

OTHER PUBLICATIONS

Mar. 10, 2017—(WO) ISR & WO—App. No. PCT/US16/064085.

Suzuki, et al., Bubble Elimination for Coating Material, [retrieved on Aug. 24, 2017]. Retrieved from the Internet <URL: *>http://www.opussystem.com/puki/index.php?plugin=attach&refer=opussystem%2F catalogue_jp&openfile=%2701%20TAPPI.pdf.

Suzuki, et al., Visualization and Analysis of Swirling Flow in Bubble Eliminator, [retrieved on Aug. 2017, [retrieved on Aug. 17, 2017]. Retrieved from the Internet <URL:*>http://www.opussystem.com/puki/index.php?plugin=attach&refer=opussystem%2Fcatalogue_jp&openfile=%2702%20IFPE%20%20%282%29.pdf.

Tanaka et al., Experimental and Numerical Investigation of Active Heat Exchange for Fluid Power Systems. 7th International Symposium on Fluid Control, Measurement and Visualization, [retrieved on Aug. 24, 2017]. Retrieved from the Internet <URL:*>http://www.opussystem.com/puki/index.php?plugin=attach&refer=opussystem%2Fcatalogue_jp&openfile=%2703%20FLCOME.pdf.

Suzuki, et al., Bubble Elimination in Hydraulic Fluids: Part 1—Basic Principle and Technology Overview, [retrieved on Aug. 24, 2017]. Retrieved from the Internet <URL:*>http://www.opussystem.com/puki/index.php?plugin=attach&refer=opussytem%2Fcatalogue_jp&openfile=$2705%20IFPE%20%281%29.pdf.

Suzuki, et al., Downsizing of Oil Reservoir by Bubble Eliminator, [retrieved on Aug. 24, 2017]. Retrieved from the Internet <URL:*>http://www.opussystem.com/puki/index.php?plugin=attach&refer=opussytem%2Fcatalogue_jp&openfile=%2705%20JFPS%20%281%29.pdf.

Nagashi, et al., Bubble Elimination for Hydraulic Systems, [retrieved on Aug. 24, 2017]. Retrieved from the Internet <URL:*>http://www.opussystem.com/puki/index.php?plugin=attach&refer=opussytem%2Fcatalogue_jp&openfile=%2708$20FPNI-PHD%20Symposium.pdf.

Suzuki, et al., Bubble Elimination Device in Hydraulic Systems, [retrieved Aug. 24, 2017]. Retrieved from the Internet <URL:*>http://www.opussystem.com/puki/index.php?plugin=attach&refer=opussytem%2Fcatalogue_jp&openfile=%279%20ASME.pdf.

Sakama, et al., Optimal Design of Bubble Eliminator by Numerical and Experimental Investigation. Proceedings of the 8th JFPS International Symposium on Fluid Power, OKINAWA 2011, Oct. 25-28, 2011, [retrieved Aug. 24, 2017]. Retrieved from the Internet <URL:*>http://www.jfps.jp/proceedings/okinawa2011/pdf/1C1-2.pdf.

Bubble-Less Eliminator, Bubble Removal Device Catalog, [retrieved Aug. 24, 2017]. Retrieved from the Internet <URL: *>http://www.getottenassociates.com/pdf_files/Bubble%20Eliminator%20Catalog.pdf.

Tanaka, et al., Operation and Typical Application Overview of the Use of Bubble Eliminators for De-aeration of Hydraulic and Turbine Oils, [retrieved Aug. 24, 2017]. Retrieved from the Internet <URL:*>http://www.getottenassociates.com/pdf_files/Bubble%20Eliminator%20Paper%20for%20FP%20Expo%202003.pdf.

Ultrasonic Transducers, Sono Mechanics, [retrieved prior to Aug. 21, 2017]. Retrieved from the Internet <URL:*>http://www.sonomechanics.com.

Ultrasonic Horn Designs and Properties, Sono Mechanics, [retrieved prior to Aug. 21, 2017]. Retrieved from the Internet <URL:*>http://www.sonomechanics.com.

User Manual, ISP-3000 Industrial-Scale Ultrasonic Liquid Processor, [retrieved prior to Aug. 21, 2017]. Retrieved from the Internet <URL:*>http://www.sonomechanics.com.

Sonomechanics Blog (Removing Air from Oils, Epoxies, Hydraulic Fluids, Adhesives, waxes and Other Liquids) [online], Mar. 2016 [retrieved Aug. 24, 2017]. Retrieved from the Internet <URL:*>http://blog.sonomechanics.com/blog/ultrasonic-degassing-of-viscous-liquids.

Suzuki, et al., Bubble Elimination for Efficiency through Fluid Power, [retrieved Aug. 24, 2017]. Retrieved from the Internet <URL:*>http:www.opussystem.com/puki/index.php?plugin=attach&refer=oppussystem%2Fcatalogue_jp&openfile=The%207th%20IFK%202010%20Paper.pdf.

* cited by examiner

DEGASSING ELECTRORHEOLOGICAL FLUID

CROSS REFERENCE TO RELATED APPLICATION

This application claims priority to U.S. provisional patent application No. 62/552,555, titled "DEGASSING ELECTRORHEOLOGICAL FLUID" and filed Aug. 31, 2017. Application No. 62/552,555, in its entirety, is incorporated by reference herein.

BACKGROUND

Electrorheological (ER) fluids typically comprise a non-conducting oil or other fluid in which very small particles are suspended. In some types of ER fluid, the particles may have diameters of 5 microns or less and may be formed from polystyrene or another polymer having a dipolar molecule. When an electric field is imposed across an ER fluid, the viscosity of the fluid increases as the strength of that field increases. This characteristic of ER fluids can be used to control flow in a system containing an ER fluid.

SUMMARY

This Summary is provided to introduce a selection of concepts in a simplified form that are further described below in the Detailed Description. This Summary is not intended to identify key features or essential features of the invention.

In some embodiments, a system may include an output manifold that may be in fluid communication with a reservoir and that may include multiple discharge ports. Each of the discharge ports may be configured to discharge electrorheological fluid into a housing. A recovery manifold may be in fluid communication with the reservoir and may include multiple recovery ports. Each of the recovery ports may be configured to receive the electrorheological fluid from a housing. A gas remover may be positioned to extract gas from the electrorheological fluid received from the recovery ports.

In some embodiments, a method may include connecting a housing to a fluid system containing an electrorheological fluid. The fluid system may include a gas remover. After connecting the housing to the fluid system, the electrorheological fluid may be pumped through the housing and the gas remover. After pumping the electrorheological fluid through the housing and through the gas remover, the housing may be disconnected from the fluid system.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

Figure 1A:
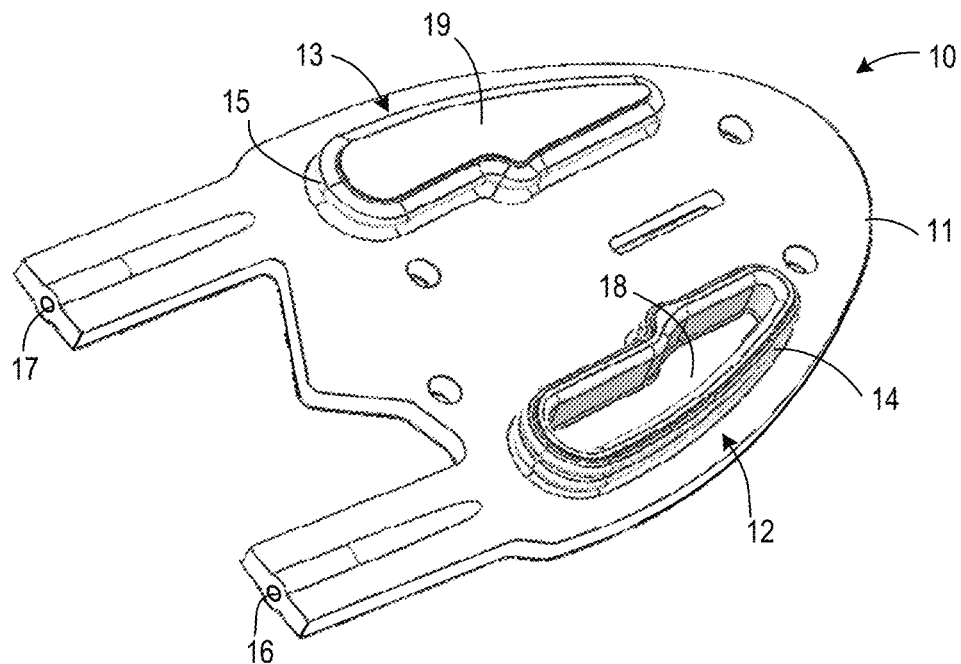
FIG. 1A is rear lateral top perspective view of an ER fluid housing according to some embodiments.

FIG. 1A is rear lateral top perspective view of an ER fluid housing 10 according to some embodiments. Housing 10 includes a main body 11 and two fluid chambers 12 and 13. Chambers 12 and 13 are bounded by flexible contoured walls 14 and 15, respectively, that extend upward from a top side of main body 11. As explained in more detail below, a channel within main body 11 connects chambers 12 and 13. Chambers 12 and 13 and the connecting channel may be filled with ER fluid using sprues 16 and 17. After filling, sprues 16 and 17 may be sealed and housing 10 used as a component of an article of footwear. In particular, housing 10 may be incorporated into a sole structure and chambers 12 and 13 placed under a support plate. ER fluid may then be allowed to flow between chambers 12 and 13 when it is desired to adjust a shape of the sole structure. Flow from chamber 13 to chamber 12 may decrease a height of a central region 19 of chamber 13 relative to main body 11 and simultaneously increase a height of a central region 18 of chamber 12. Flow in the opposite direction will have the opposite effect. When central portions 18 and 19 achieve desired heights, further height change can be stopped by energizing electrodes in the connecting channel. Energizing those electrodes increases viscosity of ER fluid in that channel and prevents further flow of ER fluid between chambers 12 and 13.

Figure 1B:
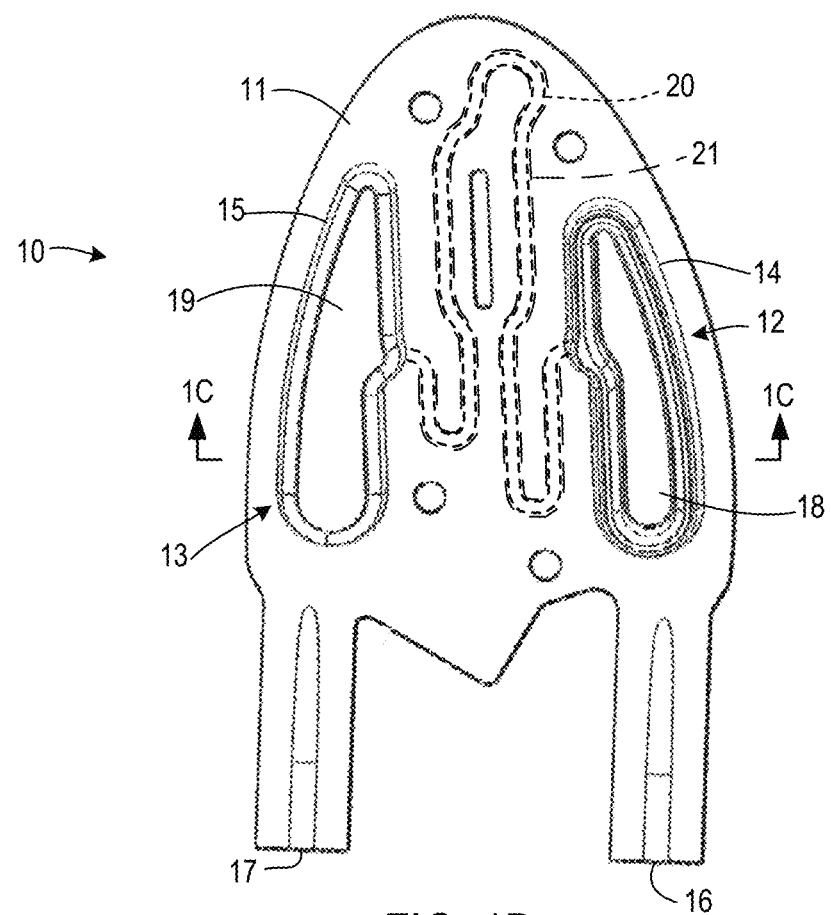
FIG. 1B is a top view of the ER fluid housing of FIG. 1A.
Figure 1C:
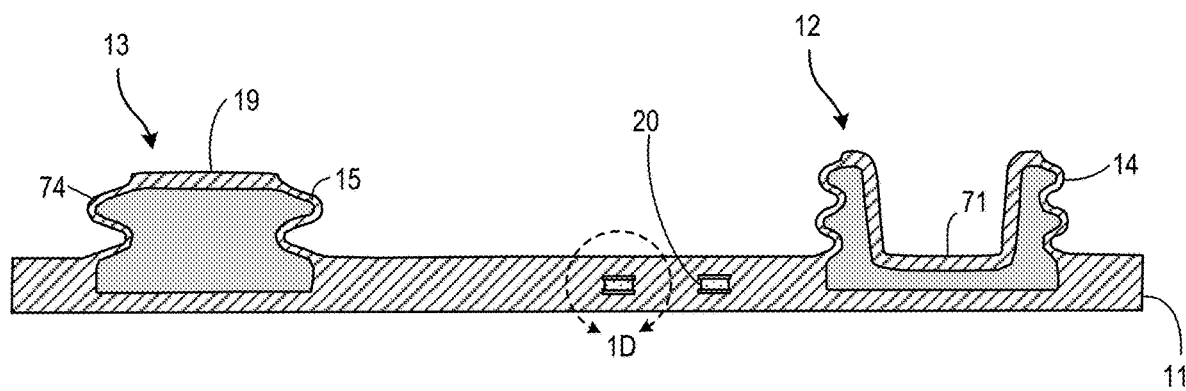
FIG. 1C is a partially schematic area cross-sectional view taken from the plane indicated in FIG. 1B.
Figure 1D:
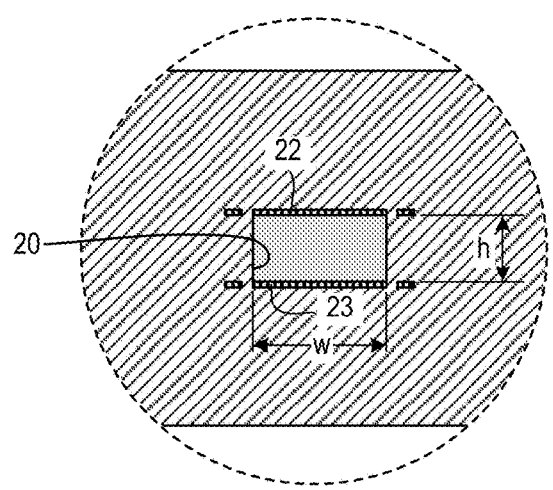
FIG. 1D is an enlarged portion of the view of FIG. 1C.

FIG. 1B is a top view of housing 10. The location of channel 20 that connects chambers 12 and 13 is indicated with small broken lines. A pair of opposing electrodes are positioned within channel 20 on bottom and top sides and extend along a portion 21 indicated in with large broken lines. FIG. 1C is a partially schematic area cross-sectional view taken along the plane indicate in FIG. 1B. Gray shading is used in FIG. 1C to indicate regions that will contain ER fluid once housing 10 is filled. As seen in FIG. 1C, chambers 12 and 13 have bellows shapes created by folds in walls 14 and 15. FIG. 1D is an enlargement of the region indicated in FIG. 1C. FIG. 1D shows additional details of channel 20 and of electrodes 22 and 23 respectively covering the top and bottom walls of channel 20 along portion 21. In some embodiments, channel 20 may have a maximum height h between electrodes of 1 millimeter (mm), an average width (w) of 2 mm, and a length along a flow path between chamber 12 and 13 of at least 200 mm.

Exemplary material for housing 10 and chambers 12 and 13 includes thermoplastic polyurethane (TPU). Exemplary material for electrodes 22 and 23 includes 0.05 mm thick, 1010 nickel plated, cooled rolled steel. Additional details of housing 10 and of other types of similar housings can be found in the U.S. Provisional patent application 62/552,548 filed Aug. 31, 2017, titled "Footwear Including an Incline Adjuster", which application is incorporated by reference herein.

Figure 2A:
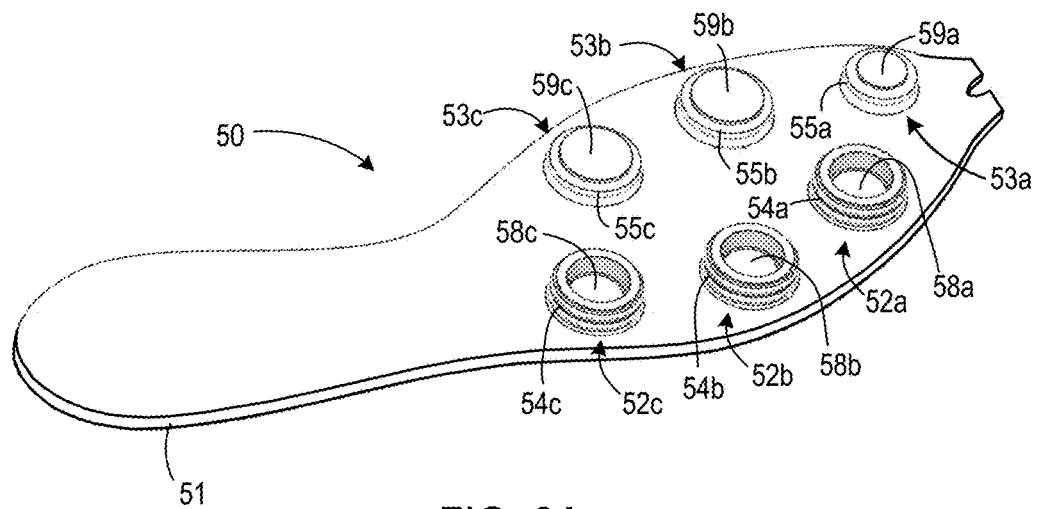
FIG. 2A is a lateral top perspective view of an ER fluid housing according to certain additional embodiments.
Figure 2B:
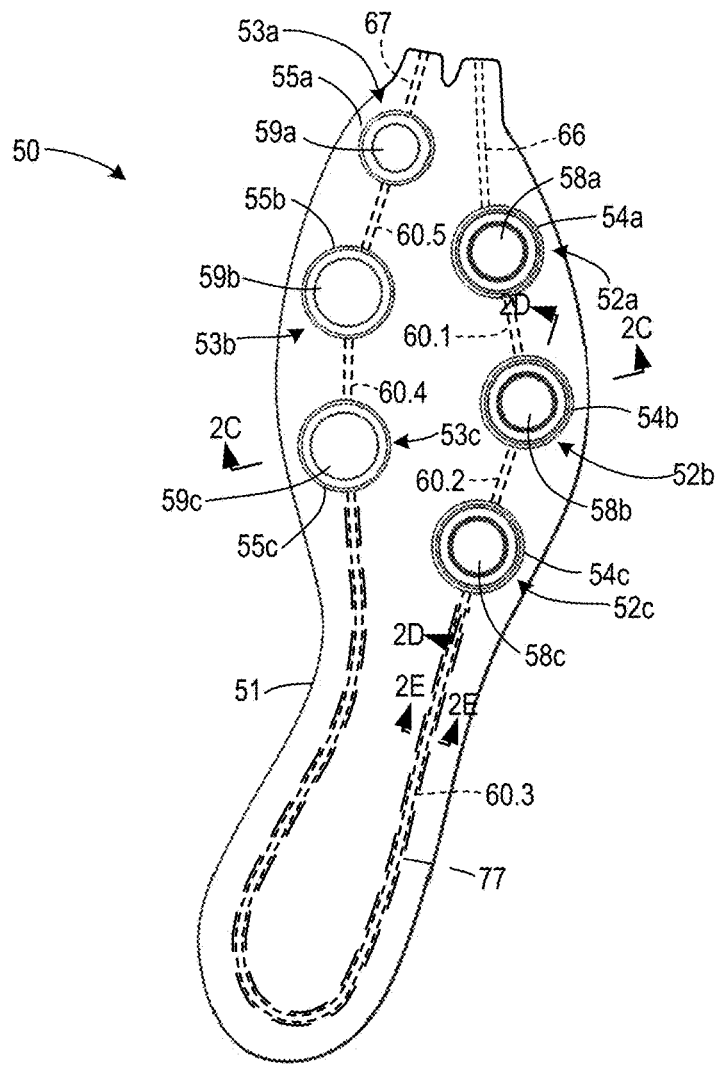
FIG. 2B is a top view of the ER fluid housing of FIG. 2A.

FIG. 2A is a lateral top perspective view of an ER fluid housing 50 according to certain additional embodiments. FIG. 2B is a top view of housing 50. Housing 50 includes a main body 51 and six fluid chambers. Chambers 52a through 52c are located on one side of housing 50, and chambers 53a through 53c are located on an opposite side. Chambers 52a through 52c and 53a through 53c are bounded by flexible contoured walls 54a through 54c and 55a through 55c, respectively, that extend upward from a top side of main body 51. Chambers 52a through 52c and 53a through 53c are connected by channels 60.1 through 60.5, which channels are located in main body 51 and are indicated in FIG. 2B with small broken lines. Opposing electrodes are positioned within channel 60.3 on bottom and top sides and extend along a portion 61 indicated in FIG. 2B with large broken lines.

Chambers 52a through 52c, chambers 53a through 53c, and channels 60.1 through 60.5 may be filled with ER fluid using sprues 66 and 67. After filling, sprues 66 and 67 may be sealed and housing 50 used as a component of an article of footwear. In particular, housing 50 may be incorporated into a sole structure and chambers 52a through 52c and 53a through 53c placed under a support plate. ER fluid may then be allowed to flow from chambers on one side (e.g., chambers 53a through 53c) to chambers on the other side (e.g., chambers 52a through 52c) to adjust a shape of the sole structure. Flow from chambers 53a through 53c to chambers 52a through 52c may decrease heights of central regions 59a through 59c of chambers 53a through 53c, respectively, relative to main body 51 and simultaneously increase heights of central regions 58a through 58c of chambers 52a through 52c, respectively. Flow in the opposite direction will have the opposite effect. Height change can be stopped by energizing electrodes in channel 60.3 to prevent further flow of ER fluid.

Figure 2C:
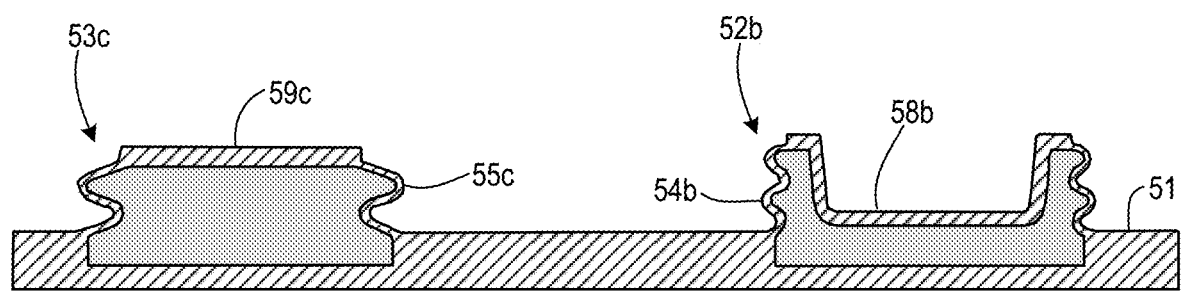
FIGS. 2C through 2E are partially schematic area cross-sectional views taken from the planes indicated in FIG. 2B.
Figure 2D:
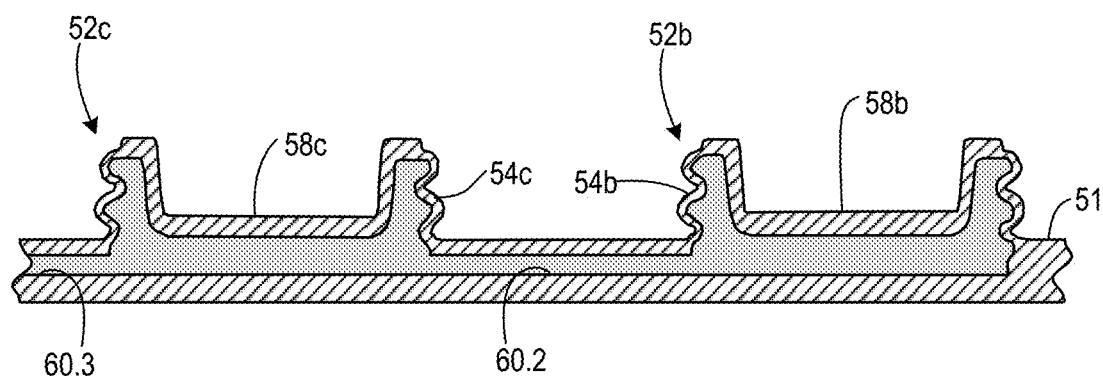
Figure 2E:
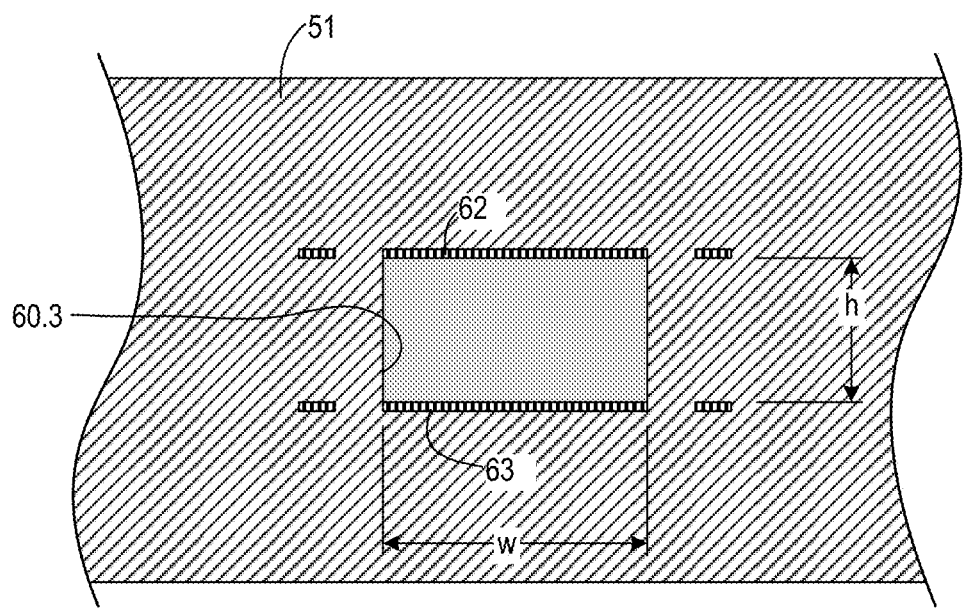

FIG. 2C through 2E are a partially schematic area cross-sectional views taken from the planes indicate in FIG. 2B. FIG. 2E is enlarged relative to FIGS. 2C and 2D. Gray shading is used in FIGS. 2C through 2E to indicate regions that will contain ER fluid once housing 50 is filled. The structure of chambers 53a and 53b is similar to that of chamber 53c, although chamber 53a is of slightly smaller diameter. The structure of chamber 52a is similar to that of chambers 52b and 52c. The structure of channels 60.1, 60.4, and 60.5 is similar to that of channels 60.2 and 60.3, although channels 60.1, 60.2, 60.4, and 60.5 lack electrodes. As seen in FIGS. 2C and 2D, chambers 52a through 52c and 53a through 53c have bellows shapes created by folds in walls 54a through 54c and 55a through 55c. FIG. 2E shows additional details of channel 60.3 and of electrodes 62 and 63 respectively covering the top and bottom walls of channel 60.3 along portion 77. In some embodiments, channel 60.3 may have a maximum height h between electrodes of 1 mm, an average width w of 2 mm, and a length along a flow path between chambers 52c and 53c of at least 270 mm. The maximum height h (between top and bottom walls) and average width w of channels 60.1, 60.2, 60.4, and 60.5 may have the same dimensions as the maximum height and average width, respectively, of channel 60.3.

Exemplary material for housing 50 and chambers 52a through 52c and 53a through 53c includes TPU. Exemplary material for electrodes 22 and 23 includes 0.05 mm thick, 1010 nickel plated, cooled rolled steel. Additional details of housing 50 and of other types of similar housings can be found in the U.S. Provisional patent application 62/552,551 filed Aug. 31, 2017, titled "Incline Adjuster With Multiple Discrete Chambers", which application is incorporated by reference herein.

When using ER fluid in a housing such as housing 10 or housing 50, it is beneficial to remove air from that fluid. If bubbles can form in the ER fluid of such a housing during operation, the device incorporating the housing may malfunction. The electrical field strength required to arc across an air gap is approximately 3 kilovolts per millimeter (kV/mm). In at least some applications employing a housing such as housing 10 or housing 50, this field strength may be less than a typical field strength needed to achieve sufficient viscosity in ER fluid within a channel to stop flow. If bubbles form and arcing occurs, the electrical field across a channel may collapse. If the electrical field were to collapse in this manner, flow through a channel would be allowed at the precise time it is desirable to inhibit flow.

It can be difficult to remove air from ER fluid used to fill a housing such as is described above. The dimensions with the chambers and channels are relatively small, and there are numerous locations within those channels and chambers where bubbles may collect during filling. These difficulties may be compounded when attempting to produce such housings in quantity, as time-consuming and labor-intensive degassing procedures can significantly increase production costs.

Various embodiments include systems and methods for removing air from ER fluid used to fill ER fluid housings. In at least some such embodiments, a system provides a source of degassed ER fluid that may be circulated through one or more housings. Multiple housings can be connected to the system and processed simultaneously. A reservoir of degassed ER fluid supplies the housings. The degassed fluid is pumped into each housing though an inlet. The incoming fluid displaces ER fluid that is already in the housing and that may still contain air. The displaced ER fluid exits each housing and is recovered by the system. The recovered ER fluid is then degassed and returned to the reservoir. By continuously pumping degassed ER fluid through each housing for a period of time, air within each housing is removed.

An example of an ER fluid that may be used in the herein-described embodiments is sold under the name "RheOil 4.0" by ERF Produktion Würzburg GmbH. That particular ER fluid has a dynamic viscosity at 25° C. of 35 mPa*s and a kinematic viscosity at 25° C. of 34 mm$^2$/s.

Figure 3A:
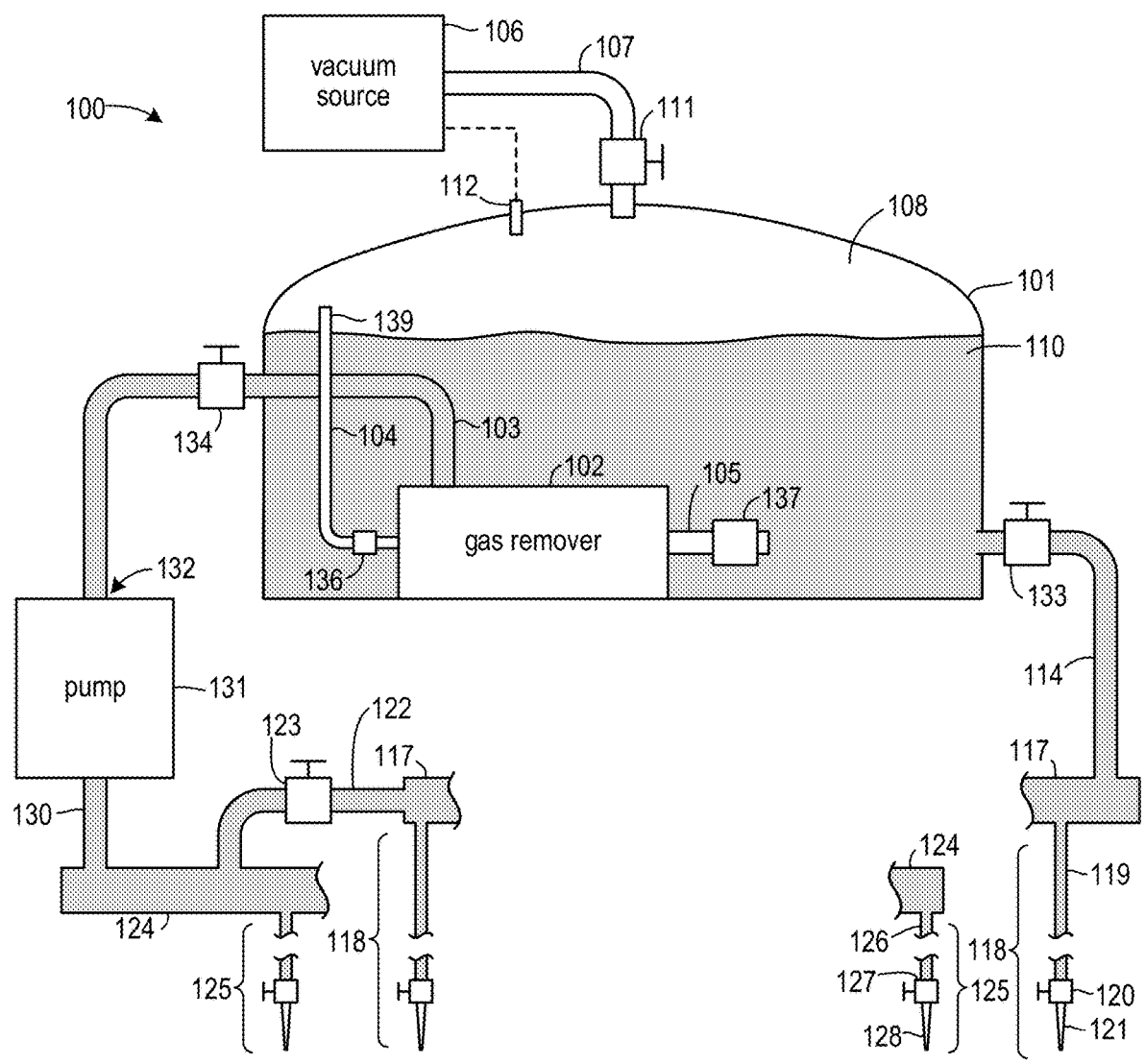
FIG. 3A is a block diagram of a fluid system according to some embodiments.

FIG. 3A is a partially schematic block diagram showing a fluid system 100 according to some embodiments. In FIG. 3A and subsequent figures, system 100 and other systems, as well as methods for using such systems, are described by reference to examples involving one or more housings 10. However, the systems and methods described herein could be used to fill a single housing 10, to fill one or more housings 50, to fill one or more housings of another type, and/or to fill combinations of housings of different types.

System 10 includes a reservoir 101. Reservoir 101 is a tank that holds ER fluid 110. In at least some embodiments, a reservoir has an internal volume that is substantially greater than an internal volume of a fluid housing processed by the system that includes that reservoir. As but one example, housings such as housings 10 and 50 may have internal volumes that are able to hold ER fluid of approximately 22 milliliters and 24 milliliters, respectively. Conversely, a reservoir such as reservoir 101 may have an internal volume that holds at least 10 liters of ER fluid.

A gas remover 102 is positioned within tank 101. Incoming ER fluid 110 that is recovered from housings 10 being processed with system 100 is received through an intake conduit 103 and injected into gas remover 102. Gas remover 102 removes air entrained from the incoming fluid and exhausts the removed air through a vent tube 104. An end 139 of vent tube 104 is positioned above the surface of ER fluid 110 to avoid dissolution of exhausted air in ER fluid 110. Degassed ER fluid 110 exits gas remover 102 from an outlet 105. In some embodiments, and as discussed in more detail below, gas remover 102 may be a centrifugal flow bubble remover.

Reservoir 101 is connected to a vacuum source 106 by a vacuum line 107. A valve 111 may be opened to connect vacuum source 107 to the interior of reservoir 101, and closed to isolate the reservoir 101 interior from the vacuum source 107. When the valve 111 is open, vacuum source 107 maintains a sub-atmospheric pressure $P_{SA}$ in the headspace 108 between the top of reservoir 101 and the surface of fluid 110 within reservoir 101. Pressure $P_{SA}$ is lower than an ambient atmospheric pressure PA in the environment of system 100 outside reservoir 101. In at least some embodiments, $P_{SA}$ is 24 millibars or lower. Vacuum source 106 may include a vacuum pump that runs continuously when activated. In some embodiments, a pump of vacuum source 106 may receive a signal from a pressure sensor 112 within reservoir 101 and be configured to begin pumping when $P_{SA}$ increases to a first value (e.g., a first percentage of a desired $P_{SA}$) and to continue to pump until $P_{SA}$ reaches a second value (e.g., a second, lower, percentage of the desired $P_{SA}$). In some embodiments, vacuum source 106 may comprise a separate vacuum tank that is maintained within a desired pressured range by a vacuum pump, with the vacuum tank connected to headspace 108.

ER fluid 110 flows from reservoir 101, through a supply conduit 114, to an output manifold 117. Output manifold 117 is in fluid communication with a plurality of discharge ports 118. For convenience, only two discharge ports 118 are shown. Wavy line interruptions in the representation of manifold 117 indicate the presence of additional portions of manifold 117 and additional discharge ports 118 that have been omitted from the drawings for convenience. Each discharge port 118 includes a corresponding port supply line 119, corresponding a port valve 120, and a corresponding discharge fitting 121. In some embodiments, each discharge fitting 121 may be a tapered rubber tube that fits within a housing inlet (e.g., one of sprues 16 or 17) and that can form a fluid seal around the housing inlet. Supply lines 119 in some embodiments may be formed from flexible tubing. Valve 120 may be used to start and stop flow from a corresponding discharge fitting.

System 100 also includes a recovery manifold 124. Recovery manifold 124 is in fluid communication with a plurality of recovery ports 125. For convenience, only two recovery ports 125 are shown. Wavy line interruptions in the representation of manifold 124 indicate the presence of additional portions of manifold 124 and additional recovery ports 125 that have been omitted from the drawings for convenience. Each recovery port 125 includes a port recovery line 126, a corresponding port valve 127, and a corresponding recovery fitting 128. In some embodiments, each recovery fitting may be a tapered rubber tube, of the same dimensions as a discharge fitting, that fits within a housing outlet (e.g., one of sprues 16 or 17) and that can form a fluid seal around the housing outlet. A bypass 122 connects manifolds 117 and 124. A valve 123 of bypass 122 may be opened or closed to allow or prevent flow through bypass 122.

Wavy line interruptions in the representations of supply lines 119 and recovery lines 126 indicate additional lengths in those lines that have been omitted from the drawings for convenience. As explained in more detail below, those additional lengths may be used during some operations to invert orientations of connected ER fluid housings. Each pair of a discharge port 118 and a recovery port 125 can be used to connect an ER fluid housing to system 100, thereby placing the internal volume of the connected housing into fluid communication with gas remover 102, ER fluid reservoir 101, and other system components (when appropriate valves are open and pump(s) operating). In the drawings, only two discharge port/recovery port pairs are shown for system 100 and for systems in other embodiments. In some embodiments, system 100 and/or systems according to other embodiments may have at least 5, at least 10, or at least 20 discharge port/recovery port pairs.

Recovery manifold 124 is connected to a pump 131 by a conduit 130. Pump 131 provides the pumping action for system 100. In particular, pump 131 creates a pressure and a flow rate at output 132 that is sufficient to inject ER fluid 110 into gas remover 102 at sufficiently high speeds for gas remover 102 to operate. The output of gas remover 102 provides the pressure within reservoir 101 to pump ER fluid 110 through conduit 114, manifold 117, ports 118, connected ER fluid housings, ports 125, manifold 124, and conduit 130.

Conduits 114 and 130 may include respective valves 133 and 134 that may be closed to isolate reservoir 101 from other system components. Outlet 105 and vent conduit 104 of gas remover 102 may include respective check valves 137 and 136 to prevent backflow into gas remover 102. Check valve 137 may also provide back pressure on output 105 to facilitate operation of gas remover 102.

Figure 3B:
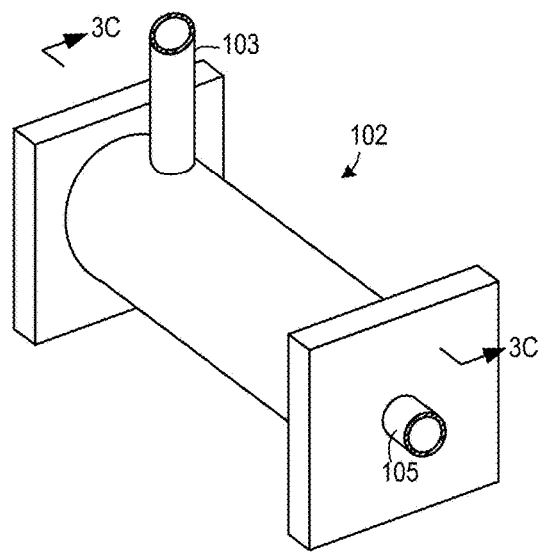
FIG. 3B is a perspective view of the gas remover from the fluid system of FIG. 3A.
Figure 3C:
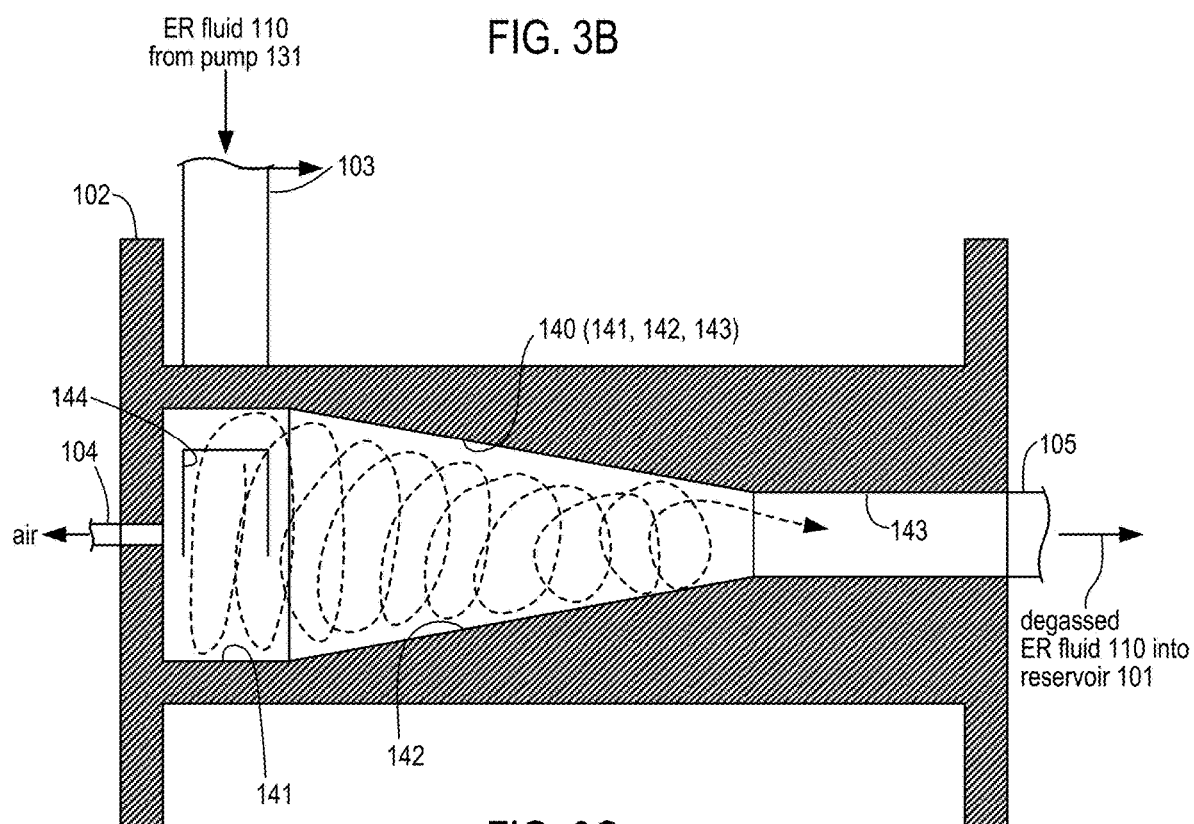
FIG. 3C is a side cross-sectional view from the plane indicated in FIG. 3B.

FIG. 3B is a perspective view of gas remover 102. FIG. 3C is a side cross-sectional view of gas remover 102 from the plane indicated in FIG. 3B. Gas remover 102 has a central bore 140 that includes a generally cylindrical first section 141, a tapered second 142, and a generally cylindrical third section 143 having a diameter smaller than the diameter of section 141. Sections 141, 142, and 143 are concentric. ER fluid 110 enters through one or more injection ports 144. Ports 144 are configured to inject ER fluid 110 tangentially around the outer perimeter of section 141 to create a swirling flow, as indicated by the approximately helical broken line. The centrifugal force of the swirling flow causes the heavier ER fluid 110 to move toward the wall of bore 140 and the lighter air in ER fluid 101 to move toward the center of bore 140. As the swirling flow of ER fluid 110 is forced through tapered section 142, an air column collects in the center of bore 140 and is forced backward and out of gas remover 102 through vent port 104. Degassed ER fluid 110 is forced forward and out of gas remover 102 through outlet 105. In some embodiments, ER fluid 110 may flow through gas remover 102 at a rate of between 10 and 50 liters/minute, and may have an outlet pressure in the range of 0.1 to 1 MPa.

In some embodiments, gas remover 102 may be a bubble remover such as is described in U.S. Pat. No. 5,240,477, which patent is incorporated by reference herein. Such bubble removers are commercially available and manufactured by Opus Systems Inc. of Tokyo, Japan.

Figure 4A:
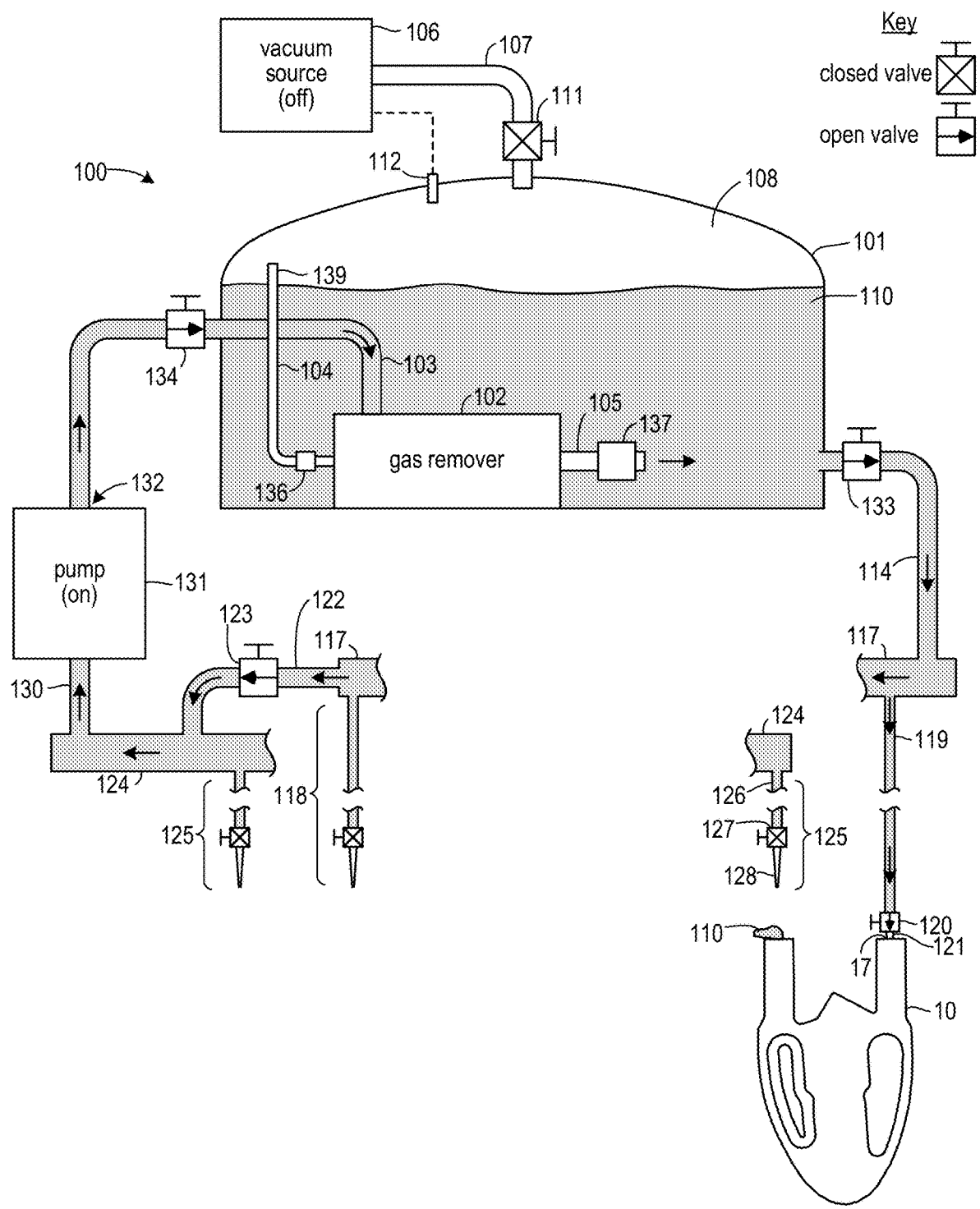
FIGS. 4A through 4G are block diagrams showing operations using the system of FIG. 3A.
Figure 4B:
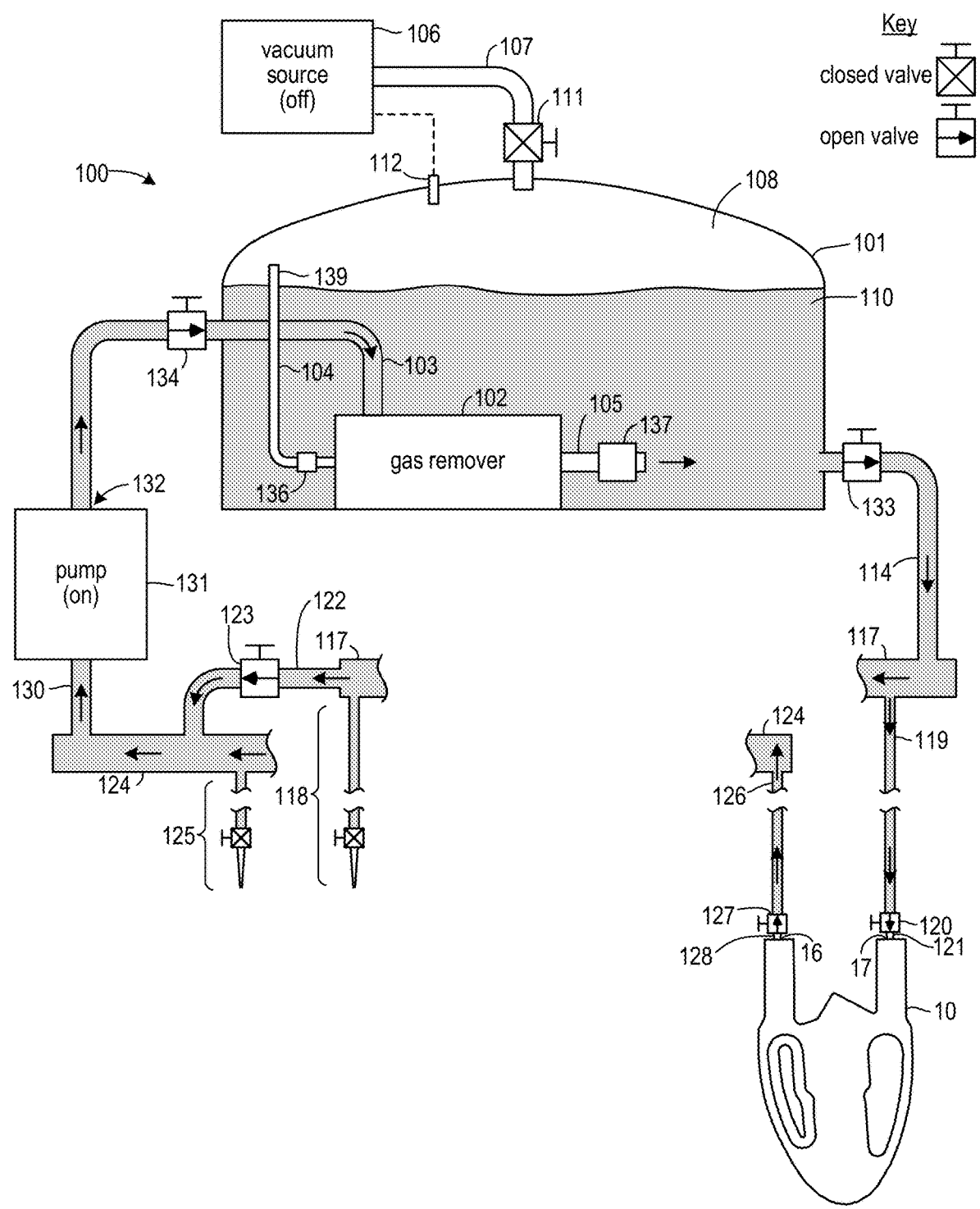

Operation of system 100 is shown in FIGS. 4A through 4G. In FIGS. 4A through 4G, states of valves are indicated by the symbols shown in the legends of each drawing figure. In particular, a closed valve is indicated by an "X" and an open valve is indicated by an arrow. On and off states of pump 131 and vacuum source 106 are indicated by added text labels. FIGS. 4A and 4B show operations to connect housings to, and initially fill housings with ER fluid from, system 100. In FIG. 4A, a discharge fitting 121 is placed into an inlet (e.g., a sprue 17) of a housing 10, and the corresponding valve 120 is opened to allow ER fluid 10 from system 100 to fill the housing. The valve 120 is allowed to remain open until ER fluid 110 begins to emerge from the housing outlet (e.g., from a sprue 16), at which point the valve 120 is closed. As shown in FIG. 4B, a fitting 128 of a recovery port 125 is then placed into the housing outlet, and the valves 120 and 127 corresponding to the fittings placed in the housing are opened. The operations of FIGS. 4A and 4B are then repeated for additional housings. During the operations of FIGS. 4A and 4B, pump 131 is on, vacuum source 106 is off, valves 133 and 134 are open, and valve 111 is closed. ER fluid 110 is flowing through system 110, as indicated by arrows. Valve 123 of bypass 122 is open so as to prevent pump 131 from having insufficient input flow while housings are being connected.

Figure 4C:
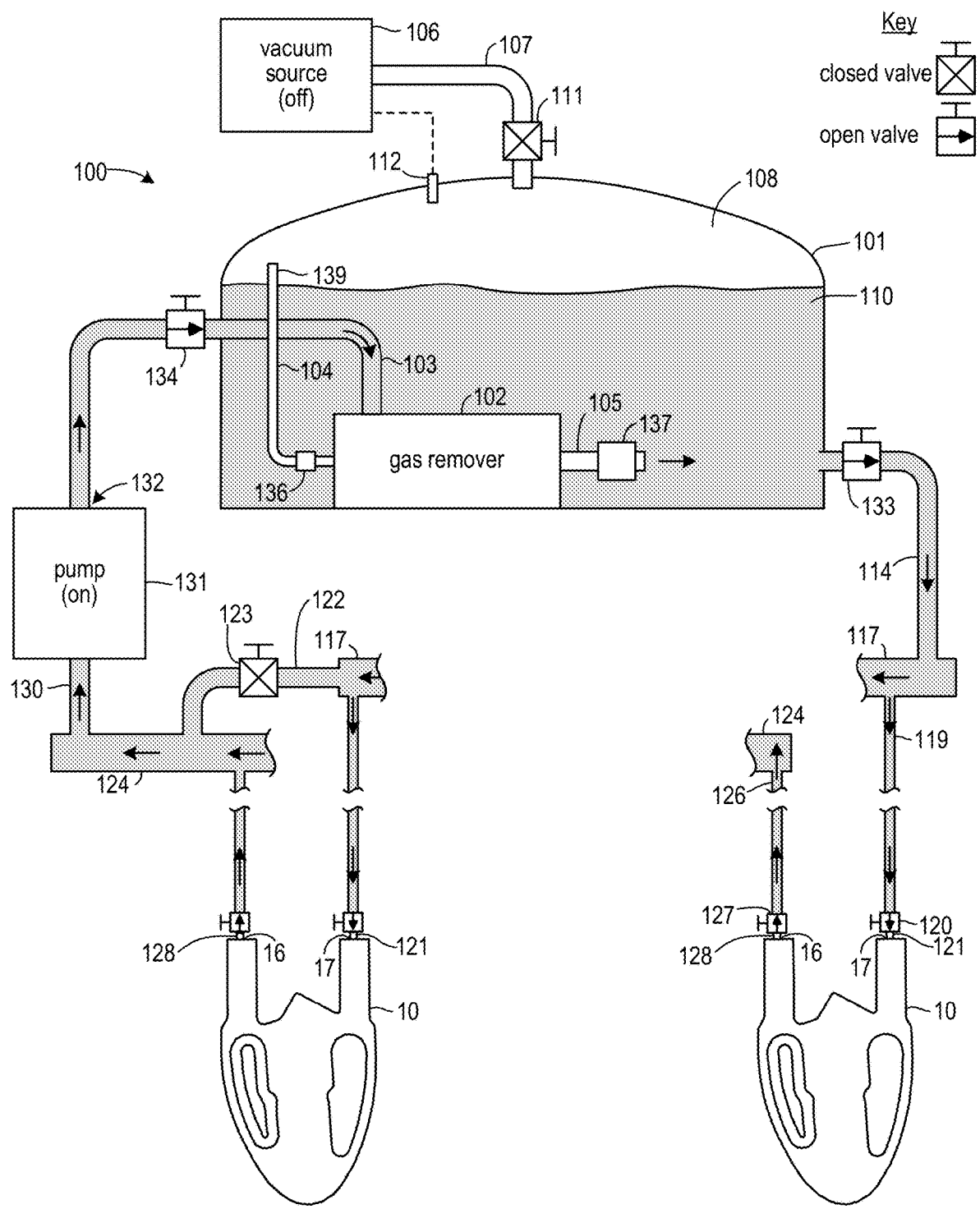

In a subsequent operation shown in FIG. 4C, after all housings have been connected, valve 123 of bypass 122 is closed to cause maximum flow of ER fluid 110 through connected housings 10. ER fluid 110 is then continuously pumped through connected housings 10 for first time interval T1. In some embodiments, T1 may have a duration of e.g., 5 minutes. During interval T1, degassed ER fluid 110 flows from manifold 117 into, and through, each connected housing 10. This flow gathers bubbles that may have formed within housings 10 during initial filling and carries those bubbles out of the housing. Recovered ER fluid 110 from each of the housings 10 flows into manifold 124 and is driven by pump 131 back to gas remover 102. Gas remover 102 exhausts those bubbles into headspace 108 through vent 104 and outputs degassed ER fluid 110 into reservoir 101 through output port 105.

Figure 4D:
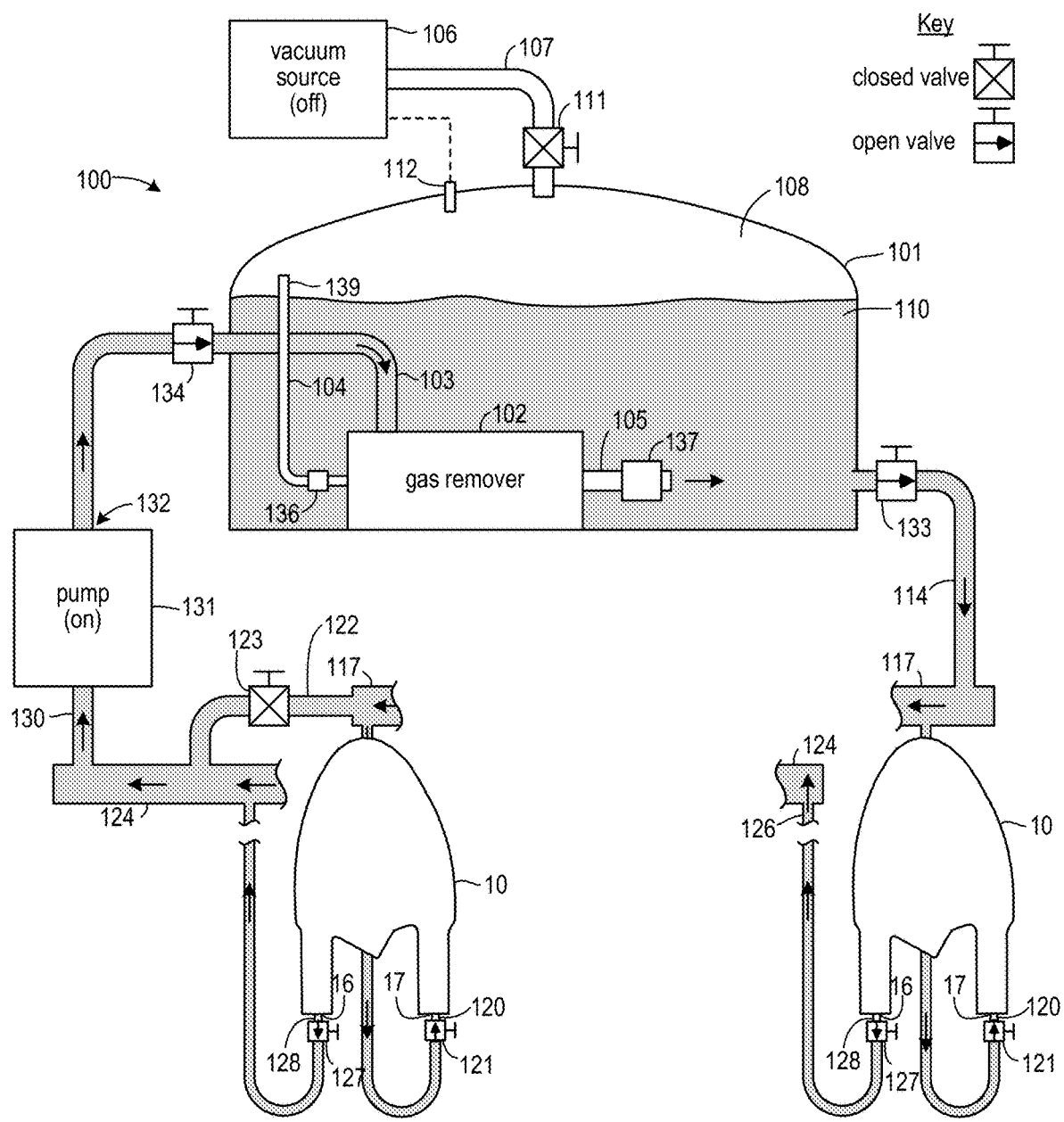

During a portion of interval T1, and as shown in FIG. 4D, connected housings 10 may be inverted in the vertical plane. In some embodiments, supply lines 119 and 126 have sufficient length to facilitate this inversion. Inversion may use gravity to help dislodge bubbles out of regions that may be partially shielded from flow and into regions receiving a stronger flow, thereby allowing such bubbles to be carried away.

Figure 4E:
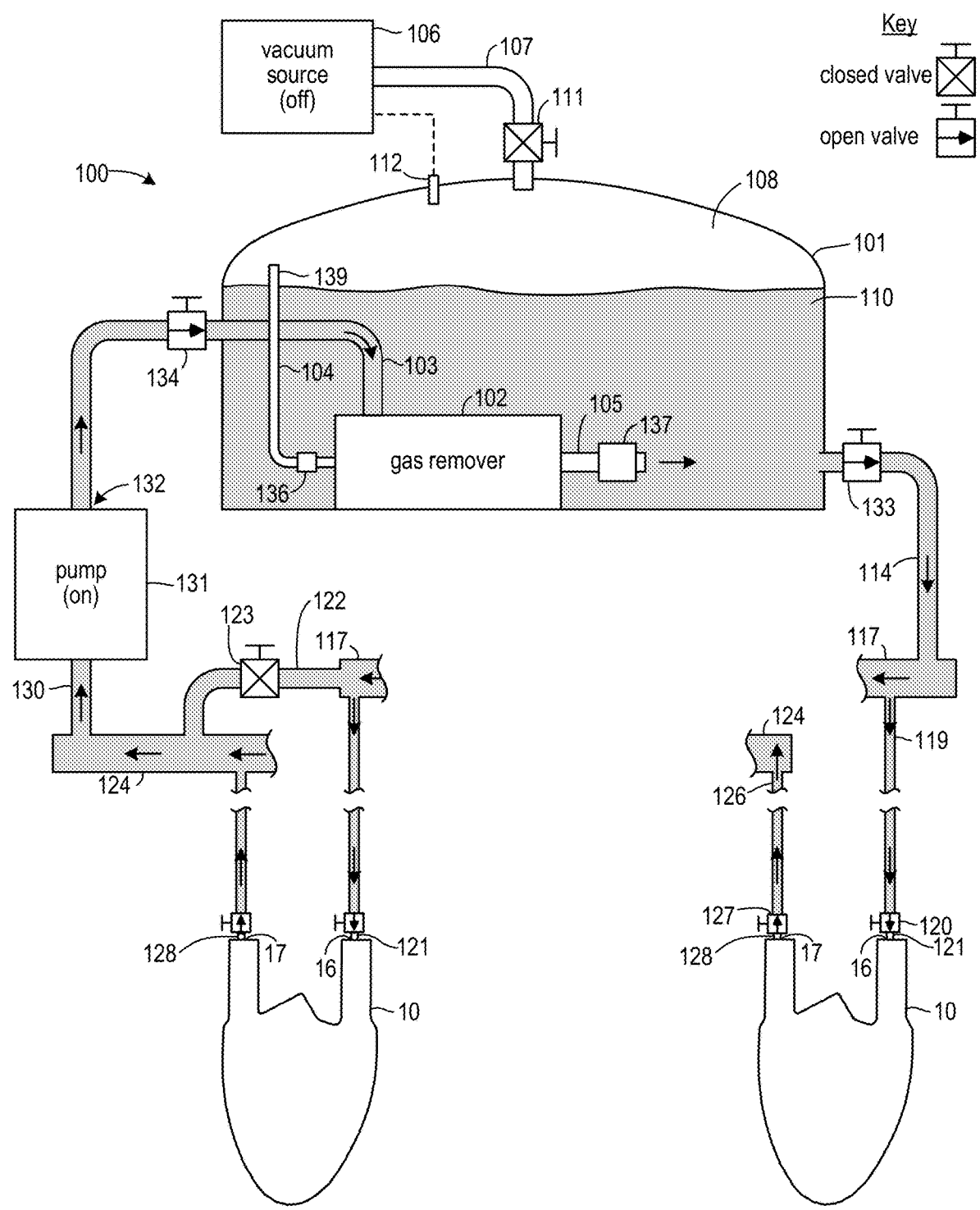

After interval T1, bypass valve 123 is opened and valves 120 and 127 are closed. Each of housings 10 is then removed and reconnected to system 110 in a reverse manner. For example, if fittings 121 and 128 were respectively located in sprues 17 and 16 of a housing 10 during interval T1, fitting 121 is placed into sprue 16 and fitting 128 is placed into sprue 17. After reconnection, the valves 120 and 127 of the reconnected fittings are opened. After each of the housings has been reconnected in this manner, and as shown in FIG. 4E, bypass valve 123 is closed. ER fluid 110 is then continuously pumped through connected housings 10 for second time interval T2. Interval T2 may have a duration that is the same as, or that is shorter or longer than, the duration of interval T1. During interval T2, degassed ER fluid 110 flows from manifold 117 into, and through, each connected housing 10 in a reverse direction relative to the flow during interval T1. This flow gathers bubbles that may have been captured in an internal housing region that is more shielded from flow in one direction, but which is less shielded from flow in the opposite direction. Recovered ER fluid 110 from each of the housings 10 again flows into manifold 124 and is driven by pump 131 back to gas remover 102. Gas remover 102 again exhausts bubbles into headspace 108 through vent 104 and outputs degassed ER fluid 110 into reservoir 101 through output port 105.

Figure 4F:
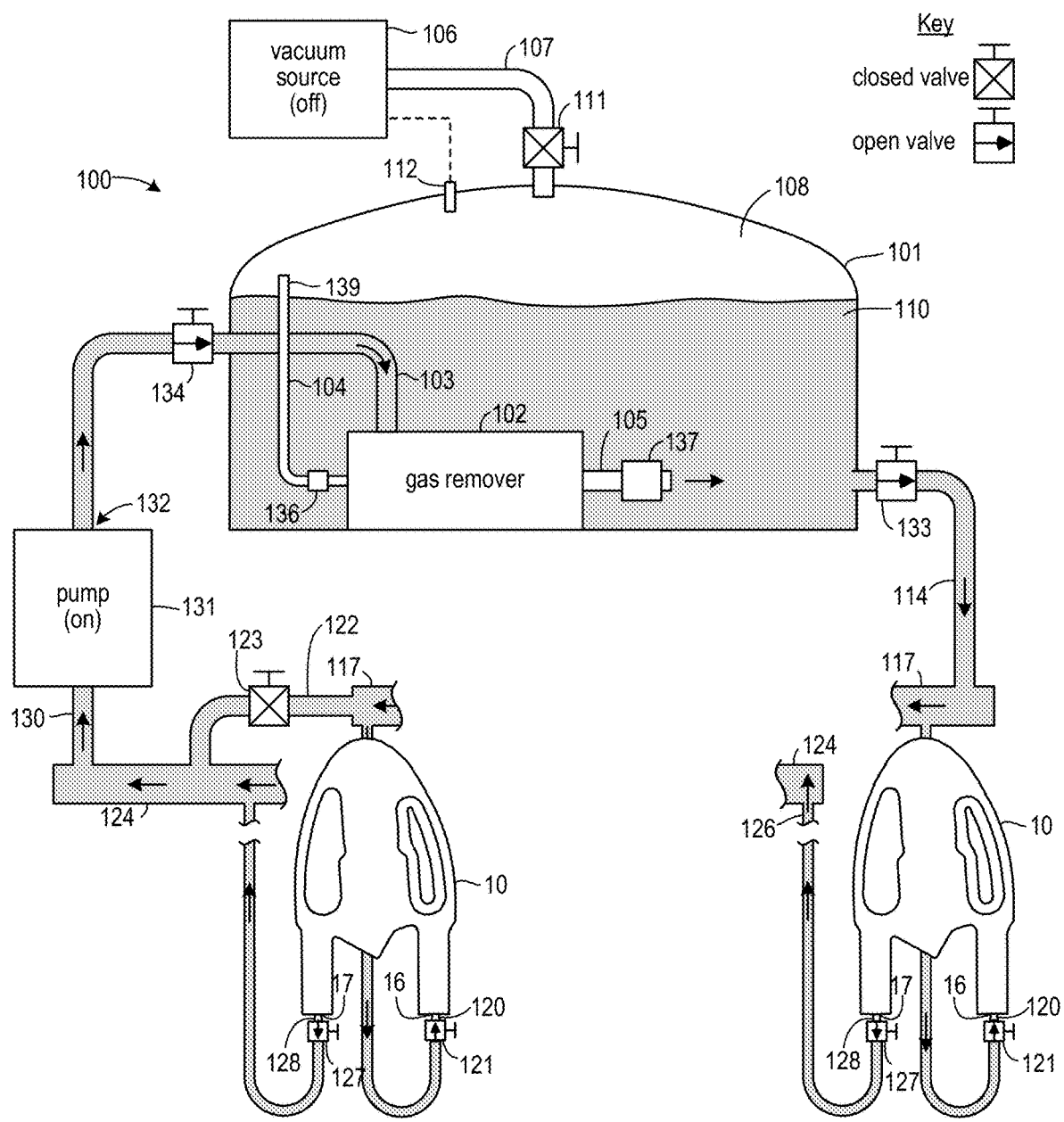

During a portion of interval T2, and as shown in FIG. 4F, connected housings 10 may again be inverted in the vertical plane.

After interval T2, bypass valve 123 is opened and the housings are removed from system 100. As each housing is removed, valves 120 and 127 corresponding to the fittings 121 and 128 removed from that housing are closed. The inlets and outlets of each removed housing may then be sealed by, e.g., RF welding across each sprue.

Figure 4G:
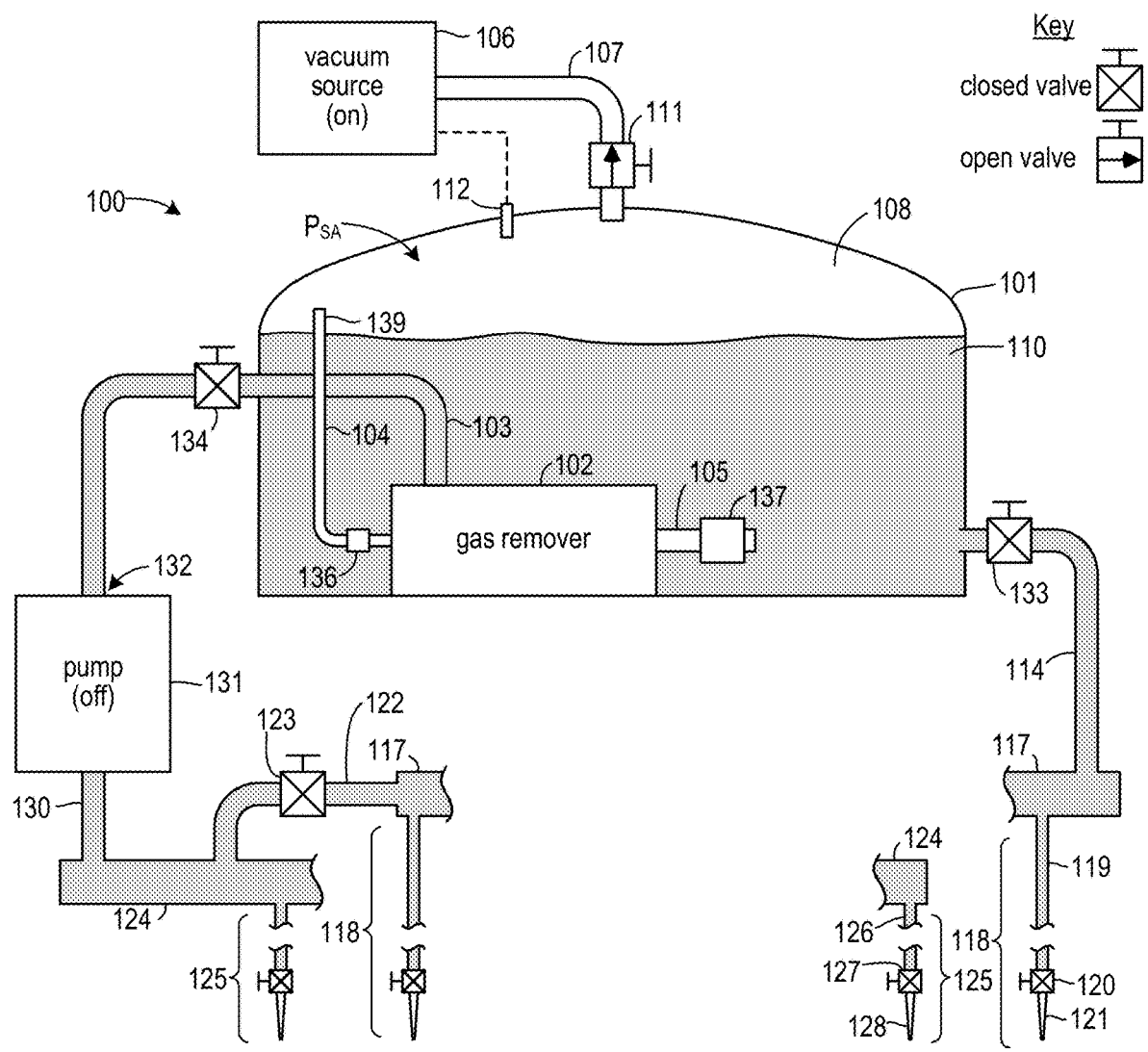

Additional series of the operations of FIGS. 4A through 4F may then be performed for additional sets of housings 10. After removal of the housings at the end of a final series of those operations, and as shown in FIG. 4G, pump 131 is turned off and valves 134 and 133 are closed. Additional ER fluid 110 may be added to reservoir 101 through a feed opening (not shown) to replace ER fluid that remains in the housings 10 that were filled during the operations of FIGS. 4A through 4F. After sealing that feed opening, valve 111 is opened and vacuum source 106 is turned on. Headspace 108 is then maintained at $P_{SA}$ during a third interval T3. In some embodiments, interval T3 may have a duration of at least 30 minutes, at least 1 hour, or at least 4 hours. While exposed to pressure $P_{SA}$, dissolved air or minute bubbles that may have escaped removal by gas remover 102 are drawn out of EF fluid 110. At the conclusion of interval T3, vacuum source 106 is turned off, valve 111 is closed, and system 100 is then available to perform further series of the operations of FIG. 4A through 4F.

Figure 5A:
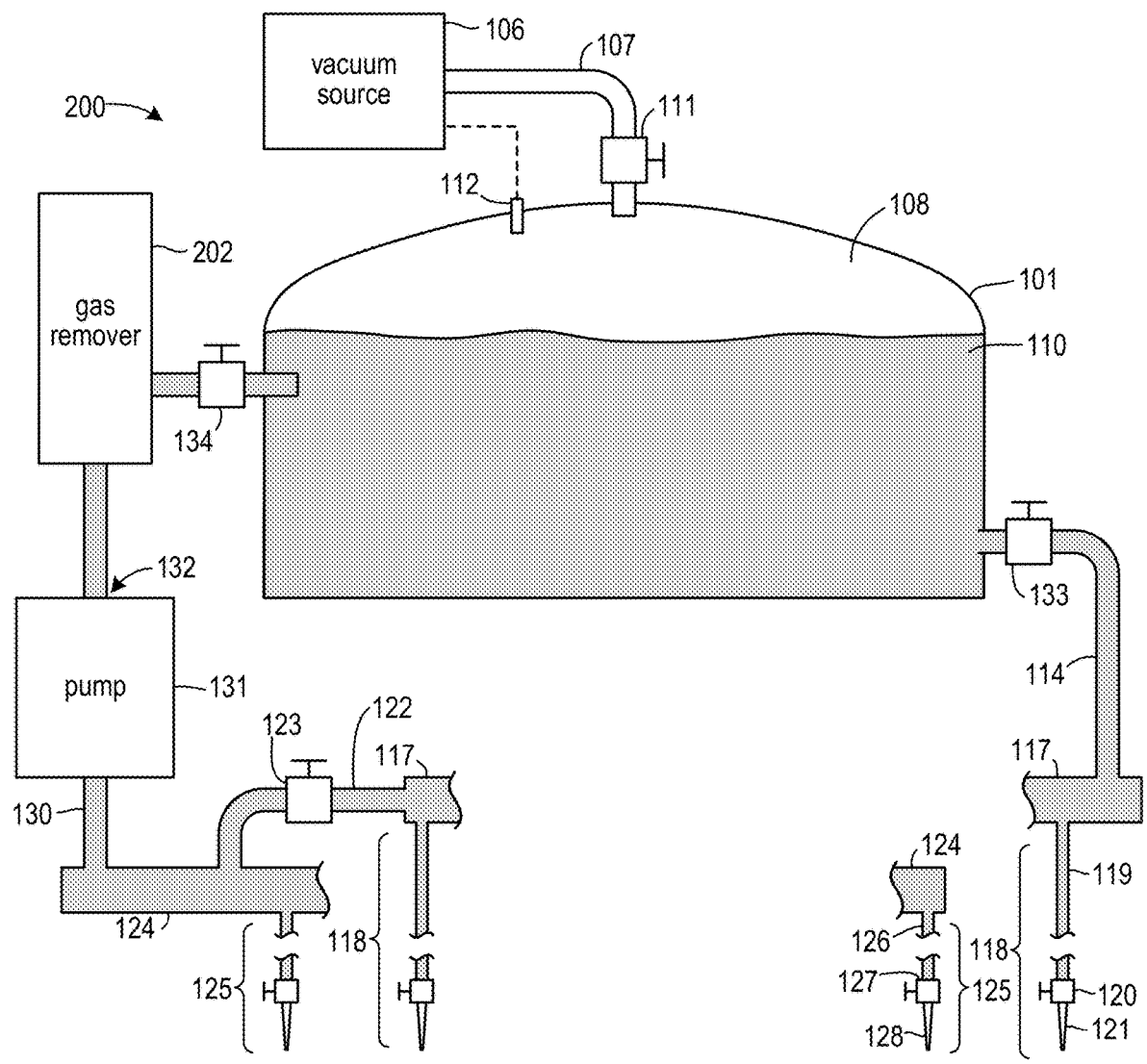
FIG. 5A is a block diagram of a fluid system according to further embodiments.

FIG. 5A is a partially schematic block diagram showing a fluid system 200 according to some further embodiments. Like system 100, system 200 includes a gas remover 202. In system 200, however, gas remover 202 is a different type of gas remover and is located outside of reservoir 101. Other elements of system 200 are the same as elements of system 100. Elements of system 200 that are the same as elements of system 100 are identified with the same reference numbers used in FIGS. 3A through 4G, and previous descriptions of details of those elements apply in connection with system 200.

Figure 5B:
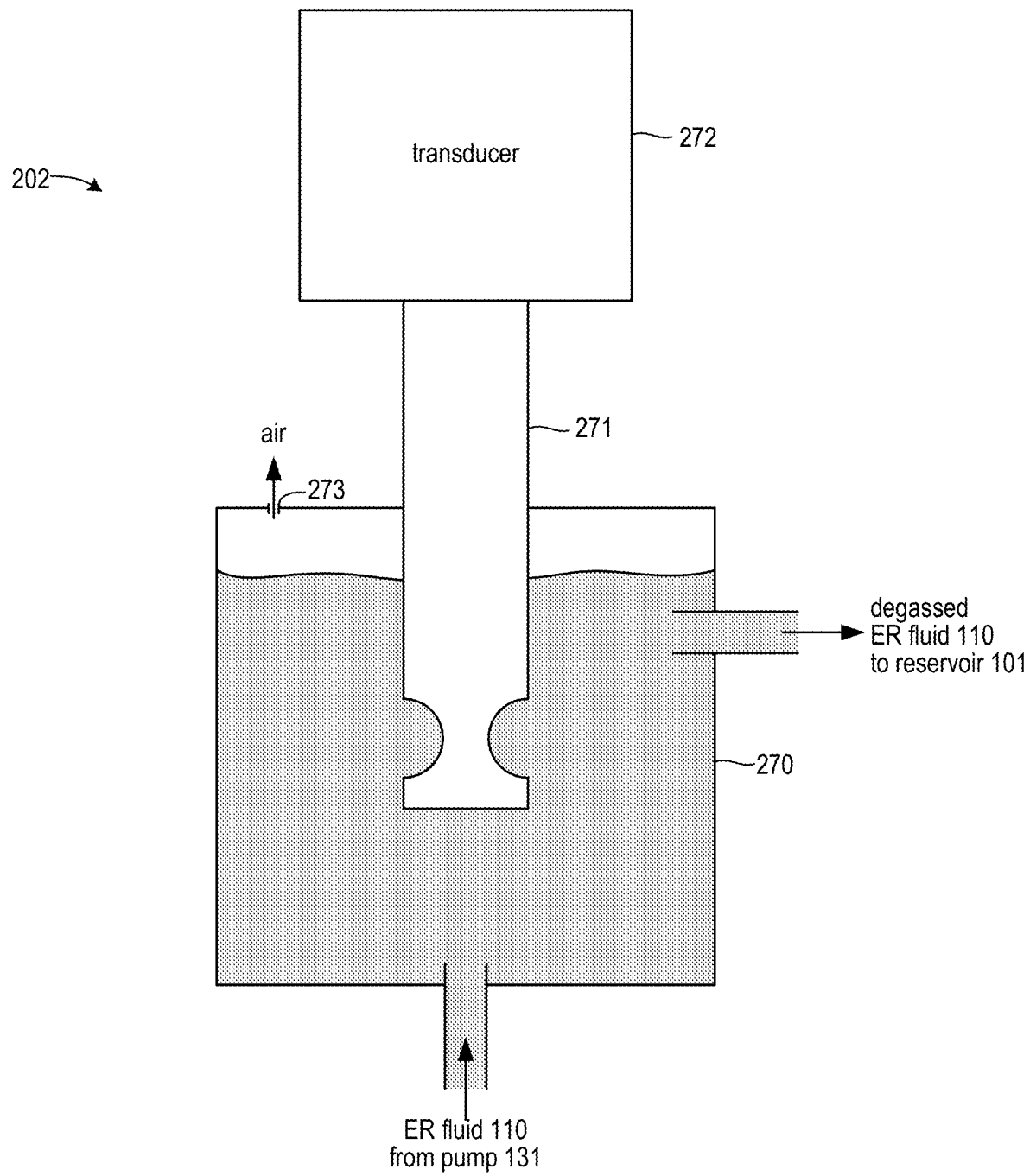
FIG. 5B is a block diagram of the gas remover from the fluid system of FIG. 5A.

FIG. 5B is a block diagram of gas remover 202. Gas remover 202 of system 200 is an ultrasonic bubble remover. Gas remover 202 includes a reactor chamber 270 into which ER fluid 110 is pumped by pump 131. During operation of system 200, the ER fluid 110 pumped into chamber 270 may have been discharged from connected housings and include gas for removal. A "barbell" horn 271 is partially immersed in ER fluid 110 within chamber 270. A transducer 272 is attached to the other end of horn 271, with transducer 272 connected to a separate generator (not shown) that drives transducer 272. Ultrasonic processors such as gas remover 202 are commercially available. One example of such a processor is the ISP-3000 Industrial-Scale Ultrasonic Liquid Processor provided by Industrial Sonomechanics, LLC of New York, N.Y., US. When gas remover 202 is turned on, ultrasonic energy from horn 271 forces gas out of ER fluid 110 within chamber 270. One or more vents 273 in chamber 270 may allow removed air to escape. In some embodiments, gas remover 202 may utilize a Full-wave Barbell Horn (FBH) with an output tip diameter of 35 mm, operated at the ultrasonic amplitude of 100 micro-meters peak-to-peak, and operated at a frequency of approximately 20 kHz.

System 200 may be used in operations similar to the operations described in connection with system 100 and FIGS. 4A through 4G. In a first set of operations, ER fluid housings may be connected to, and initially filed with ER fluid from, system 200. Except for the performance of such operations using system 200 instead of system 100, the operations to connect and initially fill ER fluid housings using system 200 are the same as the operations described in connection with FIGS. 4A and 4B.

Figure 6A:
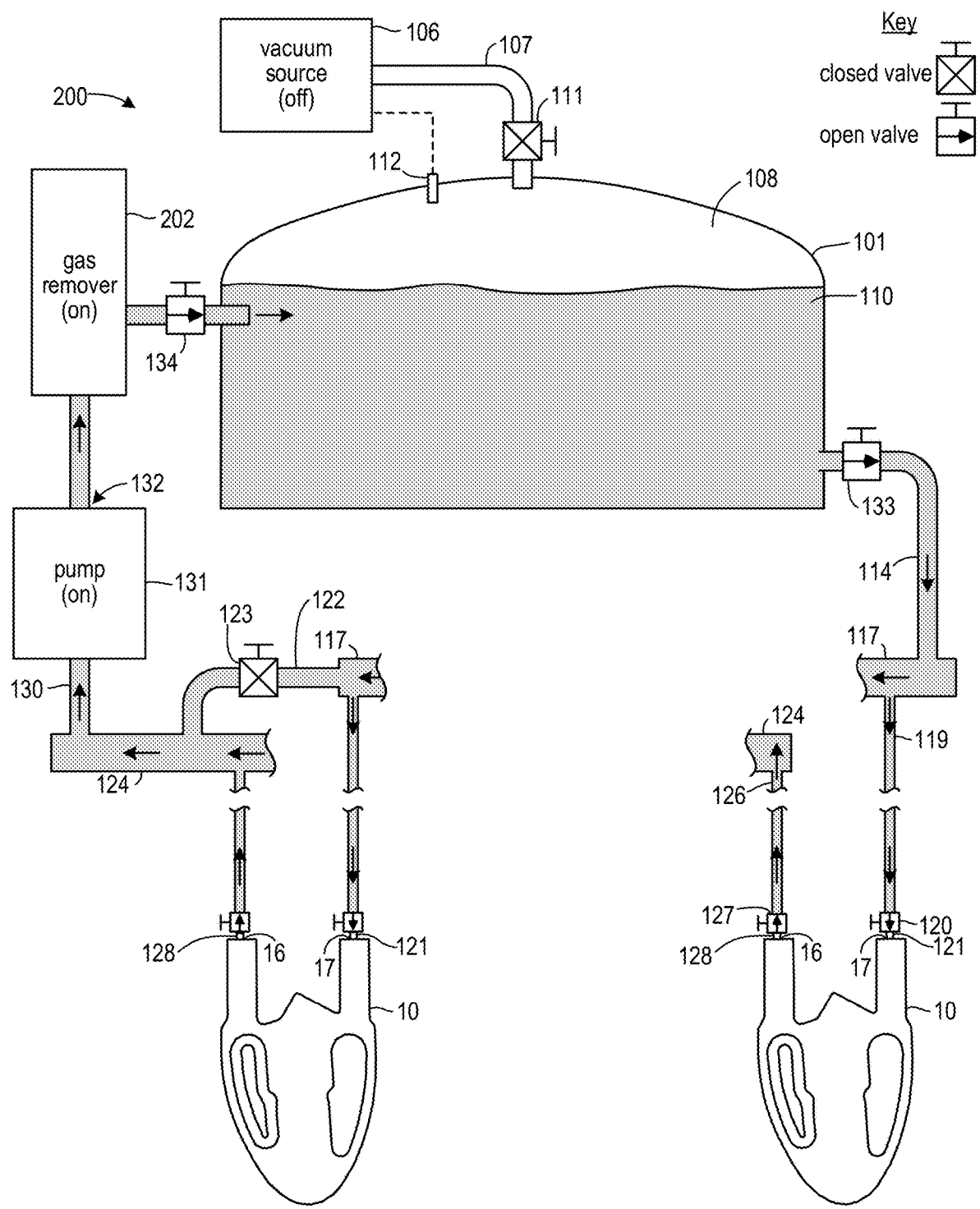
FIGS. 6A through 6E are block diagrams showing operations using the system of FIG. 5A.
Figure 6B:
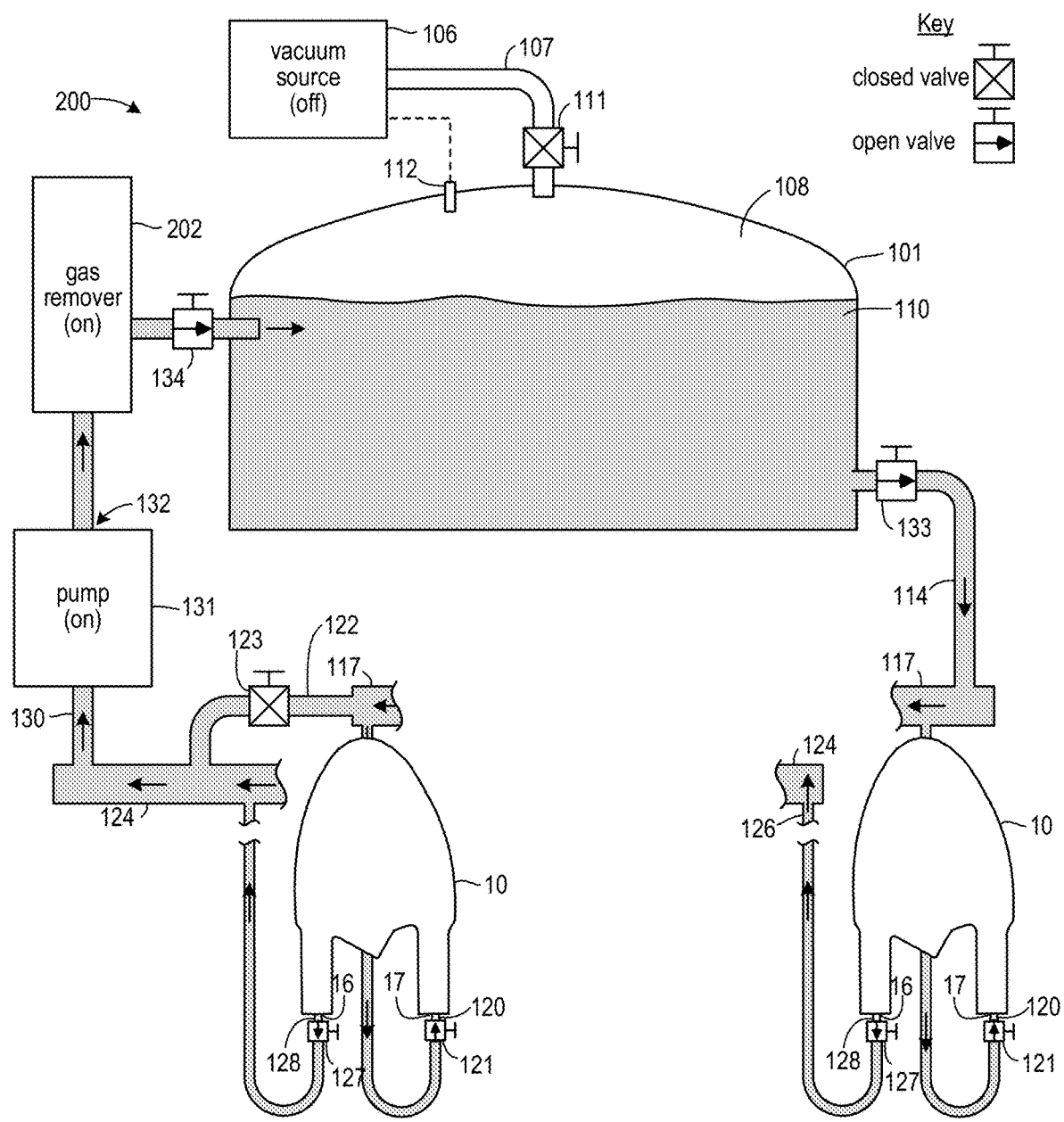

In a subsequent operation shown in FIG. 6A, after all housings have been connected, valve 123 of bypass 122 is closed to cause maximum flow of ER fluid 110 through connected housings 10. ER fluid 110 is then continuously pumped through connected housings 10 for first time interval T1. In some embodiments, T1 may have a duration of e.g., 5 minutes. During interval T1, degassed ER fluid 110 flows from manifold 117 into, and through, each connected housing 10. Recovered ER fluid 110 from each of the housings 10 flows into manifold 124 and is driven by pump 131 back to gas remover 202. Gas remover 202 removes bubbles from the recovered ER fluid 110 and outputs degassed ER fluid 110 into reservoir 101. During a portion of interval T1, and as shown in FIG. 6B, connected housings 10 may be inverted in the vertical plane.

Figure 6C:
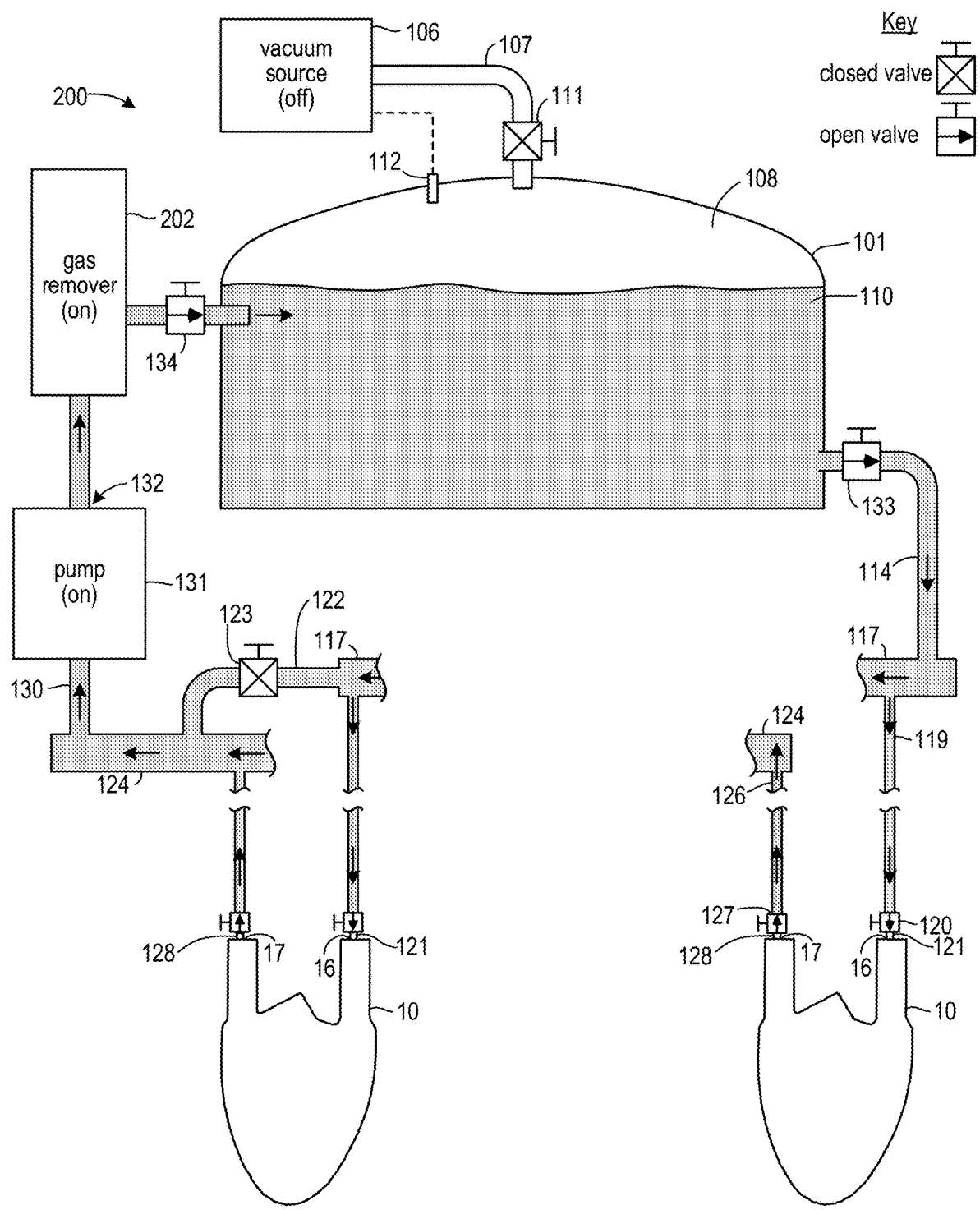
Figure 6D:
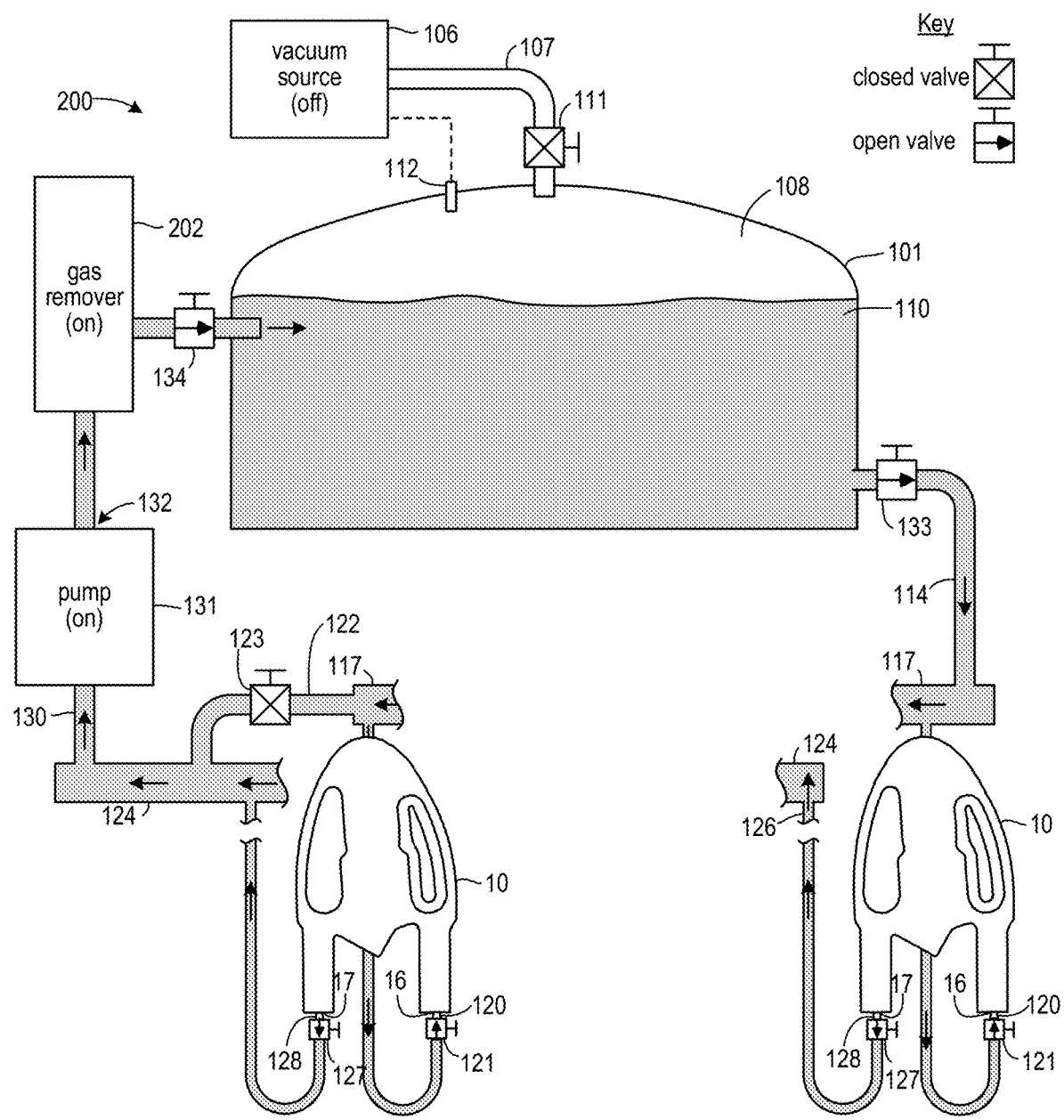

After interval T1, bypass valve 123 is opened and valves 120 and 127 are closed. Each of housings 10 is then removed and reconnected to system 200 in a reverse manner similar to that described above in connection with system 100. After reconnection, the valves 120 and 127 of the reconnected fittings are opened. After each of the housings has been reconnected in this manner, and as shown in FIG. 6C, bypass valve 123 is closed. ER fluid 110 is then continuously pumped through connected housings 10 for second time interval T2. Interval T2 may have a duration that is the same as, or that is shorter or longer than, the duration of interval T1. During interval T2, degassed ER fluid 110 flows from manifold 117 into, and through, each connected housing 10 in a reverse direction relative to the flow during interval T1. Recovered ER fluid 110 from each of the housings 10 again flows into manifold 124 and is driven by pump 131 back to gas remover 202. Gas remover 202 again removes bubbles and outputs degassed ER fluid 110 into reservoir 101. During a portion of interval T2, and as shown in FIG. 6D, connected housings 10 may again be inverted in the vertical plane.

Figure 6E:
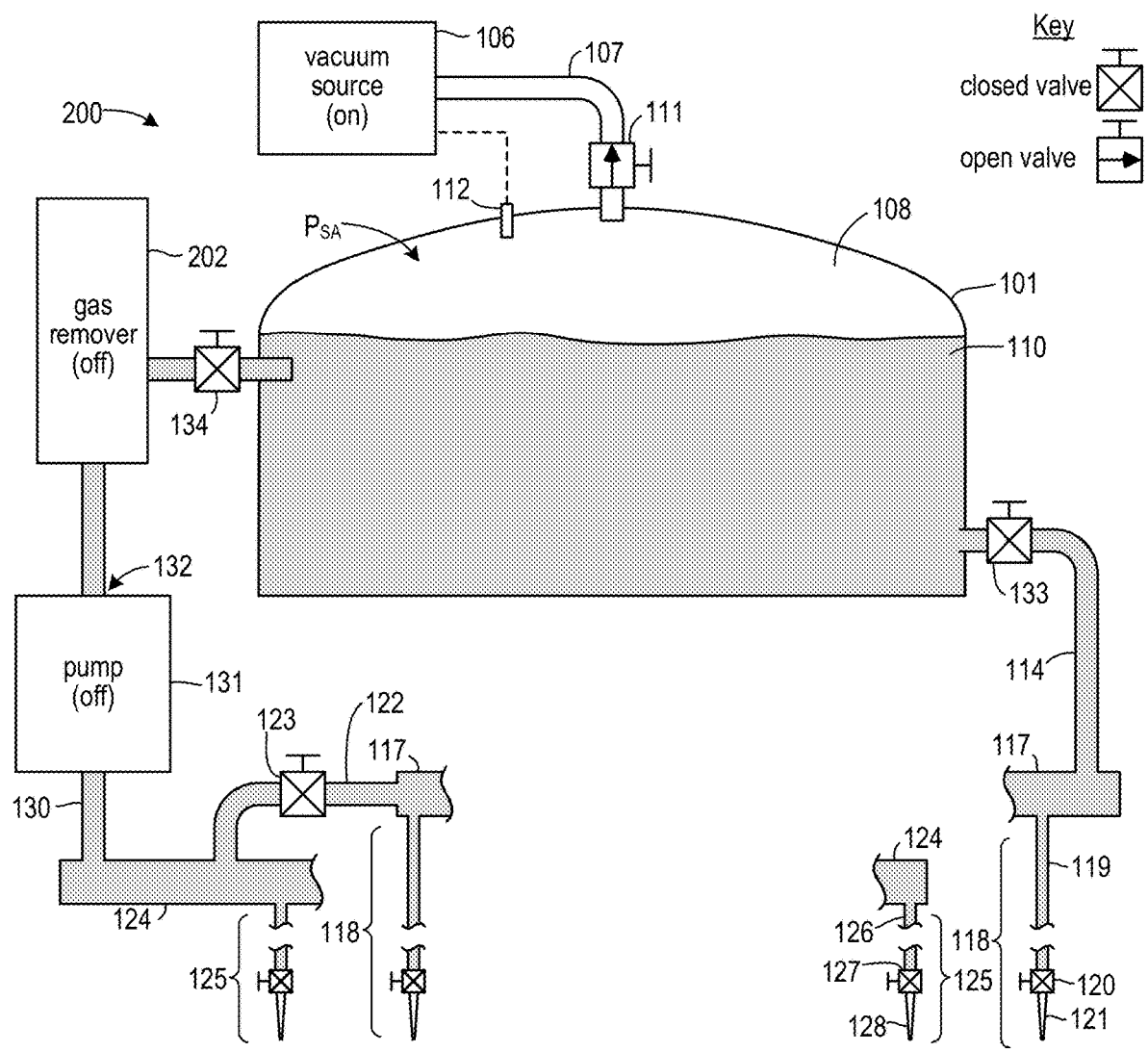

After interval T2, bypass valve 123 is opened and the housings are removed from system 200. As each housing is removed, valves 120 and 127 corresponding to the fittings 121 and 128 removed from that housing are closed. The inlets and outlets of each removed housing may then be sealed by, e.g., RF welding across each sprue. Additional series of the operations of FIGS. 6A through 6D (including initial connection and filling operations similar to those of FIGS. 4A and 4B) may then be performed for additional sets of housings 10. After removal of the housings at the end of a final series of those operations, and as shown in FIG. 6E, pump 131 is turned off and valves 134 and 133 are closed. Additional ER fluid 110 may be added to reservoir 101 through a feed opening (not shown). After sealing that feed opening, valve 111 is opened and vacuum source 106 is turned on. Headspace 108 is then maintained at $P_{SA}$ during a third interval T3. In some embodiments, interval T3 may have a duration of at least 30 minutes, at least 1 hour, or at least 4 hours. At the conclusion of interval T3, vacuum source 106 is turned off, valve 111 is closed, and system 200 is then available to perform further series of the operations of FIG. 6A through 6D.

Figure 7:
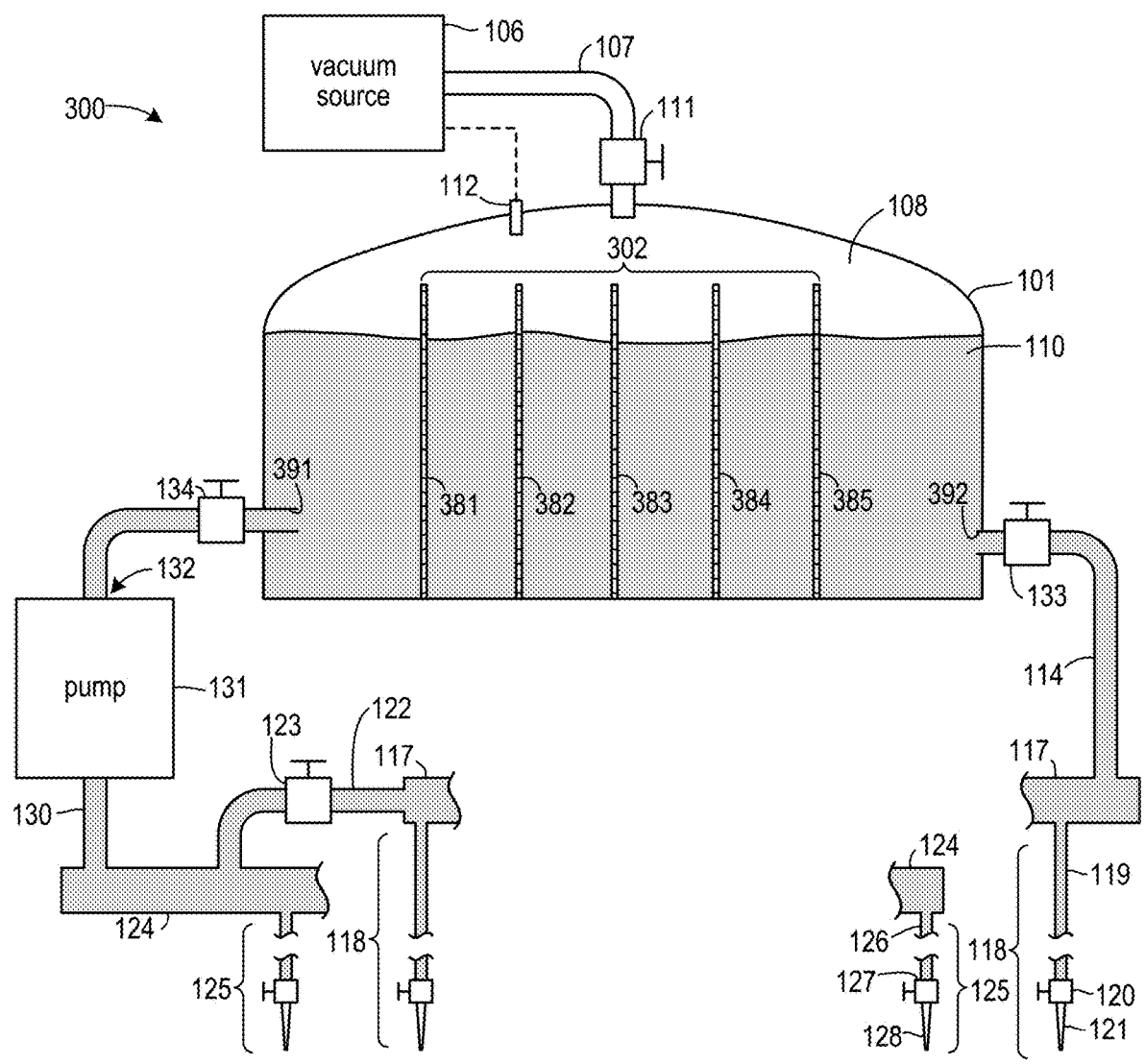
FIG. 7 is a block diagram of a fluid system according to additional embodiments.

FIG. 7 is a partially schematic block diagram showing a fluid system 300 according to some additional embodiments. Like systems 100 and 200, system 300 includes a gas remover 302. In system 300, however, gas remover 302 comprises a series of filters 381 through 385. Each of filters 381 through 385 extends completely across the interior of reservoir 101. ER fluid 110 entering reservoir 101 through inlet 391 must therefore pass through each of filters 381 through 385 before reaching outlet 392. Entrained bubbles in ER fluid 110 are captured by one of filters 381 through 385 and ultimately rise to headspace 108. Although the embodiment of FIG. 7 shows gas remover 302 having five filters, in other embodiments additional or fewer filters may be included. In some embodiments, each of the filters may be a 10 micron mesh filter. In other embodiments, one or more of the filters may be a different size filter. In some such embodiments, for example, a coarser filter may be used near inlet 391 and a finer filter may be used near outlet 392.

Other elements of system 300 are the same as elements of systems 100 and 200. Elements of system 300 that are the same as elements of previously-described systems are identified with the same reference numbers used above, and previous descriptions of details of those elements apply in connection with system 300.

System 300 may be used in operations similar to the operations described in connection with systems 100 and 200. In a first set of operations, ER fluid housings may be connected to, and initially filed with ER fluid from, system 300. Except for the performance of such operations using system 300 instead of system 100, the operations to connect and initially fill ER fluid housings using system 300 are the same as the operations described in connection with FIGS. 4A and 4B.

Figure 8A:
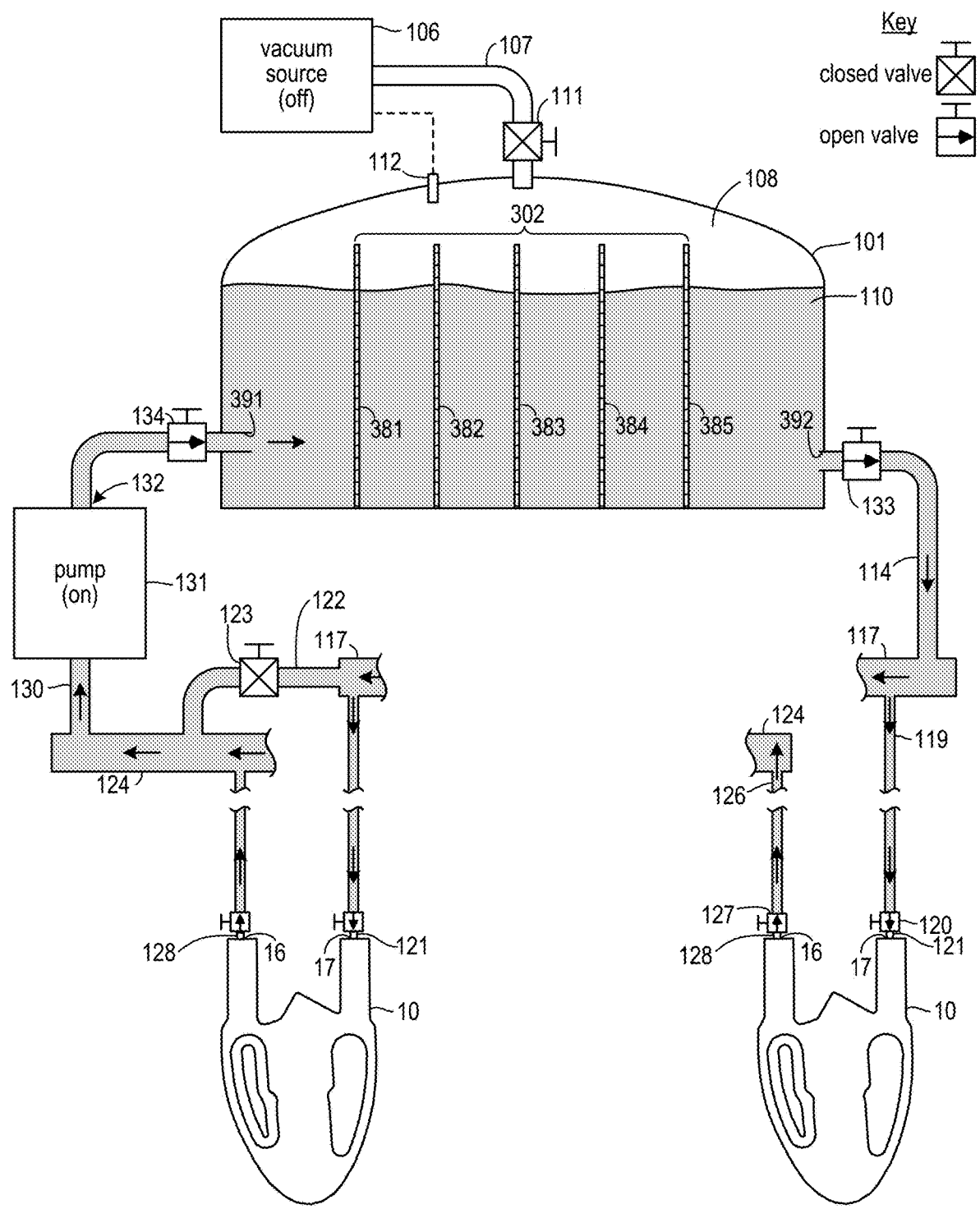
FIGS. 8A through 8E are block diagrams showing operations using the system of FIG. 7.
Figure 8B:
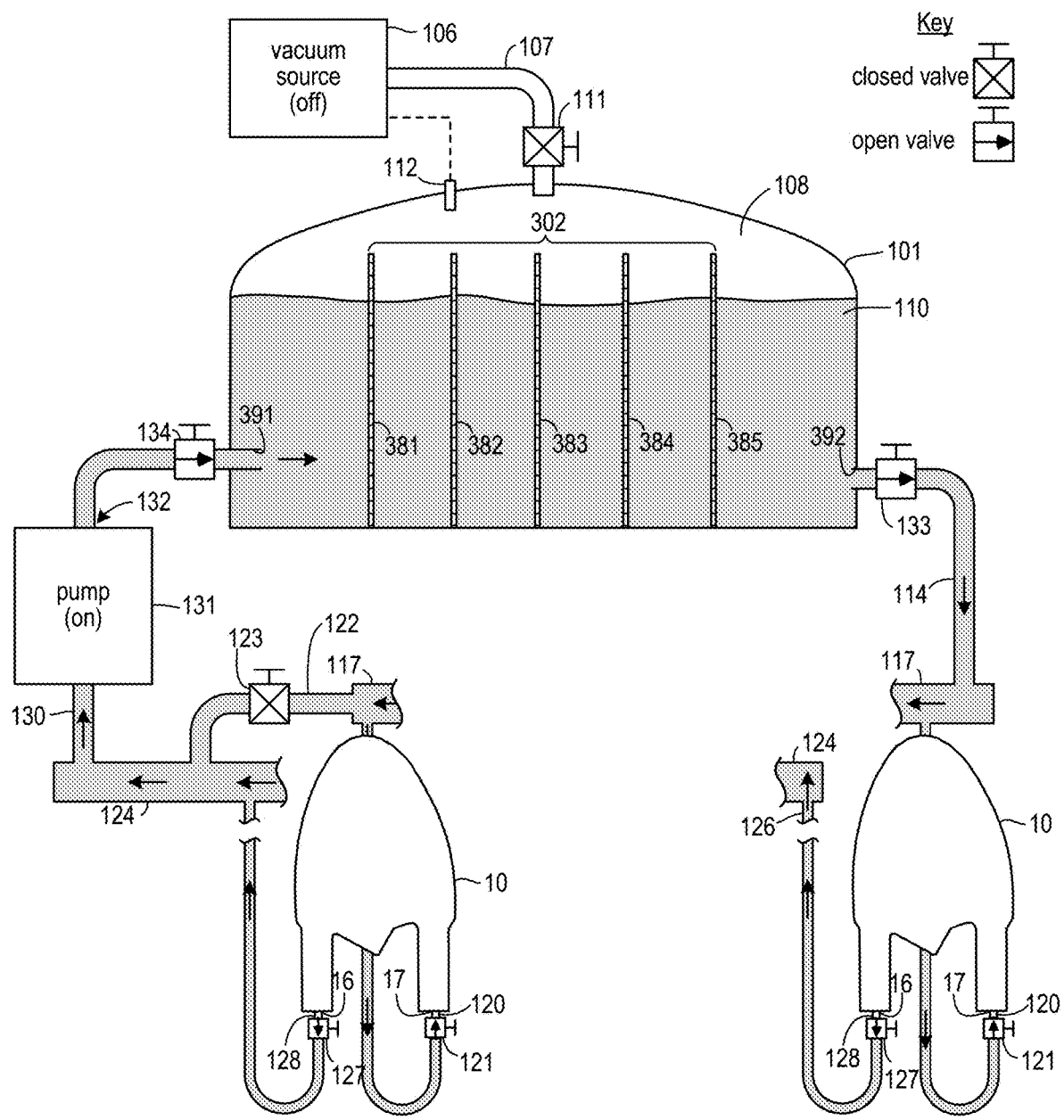

In a subsequent operation shown in FIG. 8A, after all housings have been connected, valve 123 of bypass 122 is closed to cause maximum flow of ER fluid 110 through connected housings 10. ER fluid 110 is then continuously pumped through connected housings 10 for first time interval T1. In some embodiments, T1 may have a duration of e.g., 5 minutes. During interval T1, degassed ER fluid 110 flows from manifold 117 into, and through, each connected housing 10. Recovered ER fluid 110 from each of the housings 10 flows into manifold 124 and is driven by pump 131 back to reservoir 101 and gas remover 302. Gas remover 302 removes bubbles from the recovered ER fluid 110 and provides degassed ER fluid 110 in reservoir 101 near outlet 392. During a portion of interval T1, and as shown in FIG. 8B, connected housings 10 may be inverted in the vertical plane.

Figure 8C:
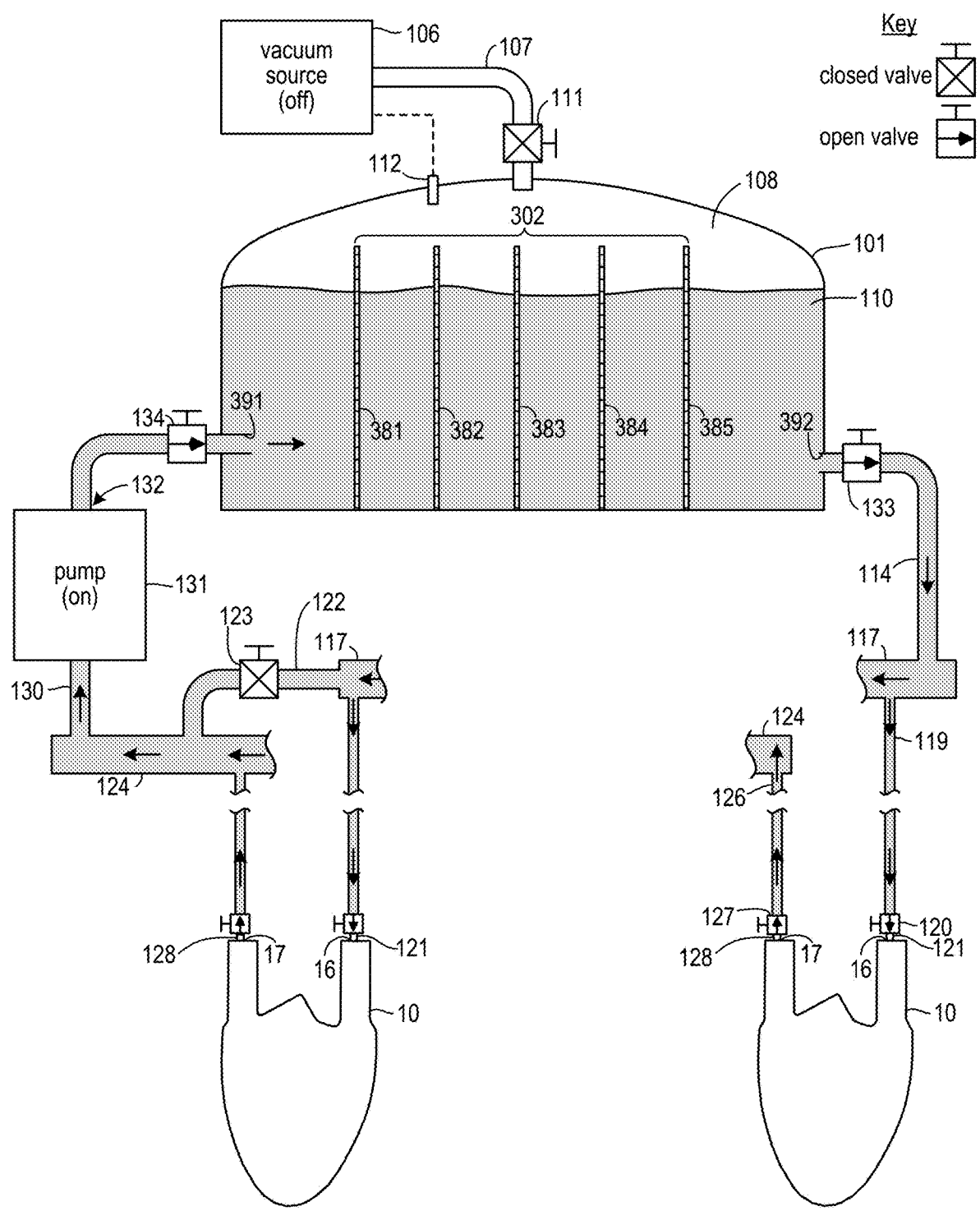
Figure 8D:
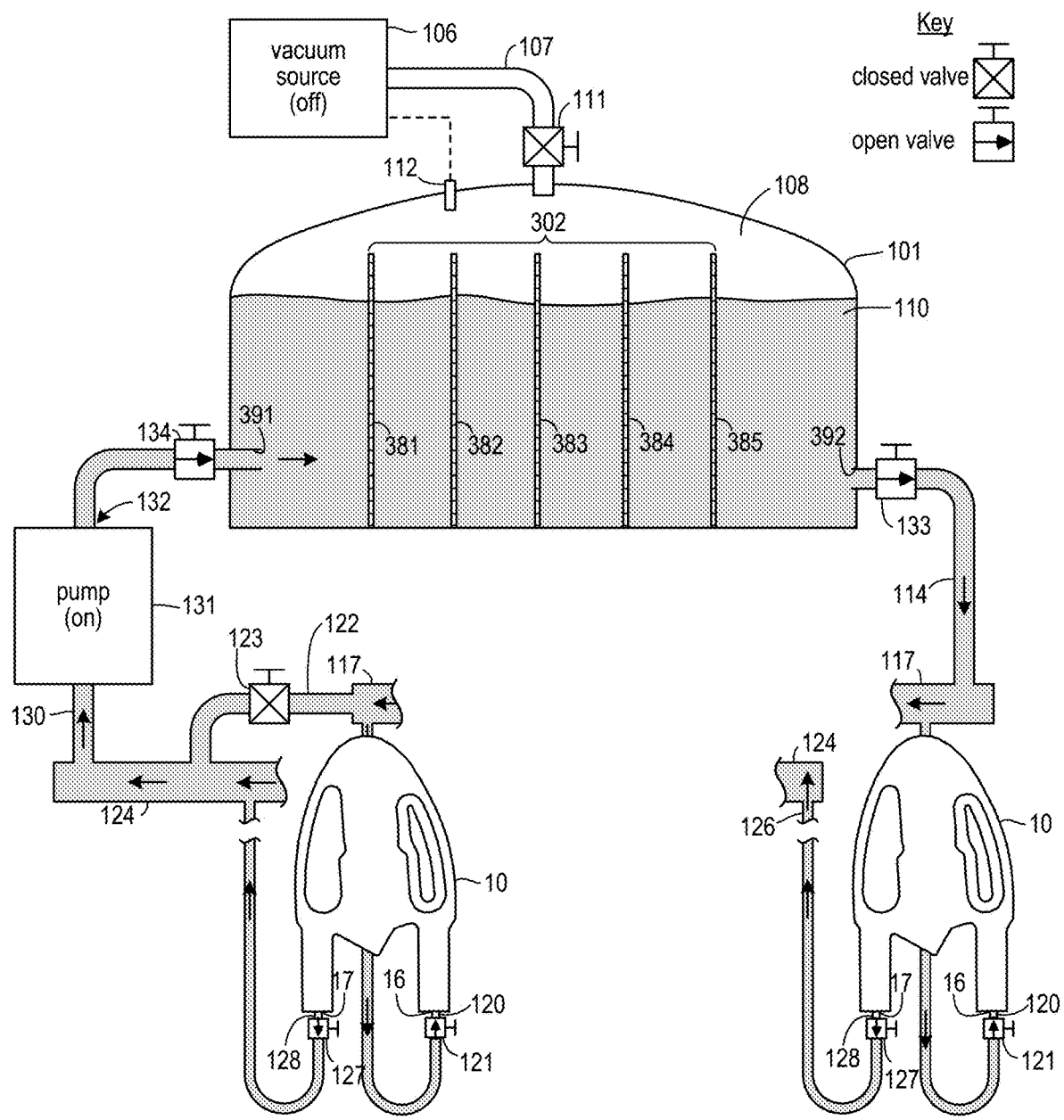

After interval T1, bypass valve 123 is opened and valves 120 and 127 are closed. Each of housings 10 is then removed and reconnected to system 300 in a reverse manner similar to that described above in connection with system 100. After reconnection, the valves 120 and 127 of the reconnected fittings are opened. After each of the housings has been reconnected in this manner, and as shown in FIG. 8C, bypass valve 123 is closed. ER fluid 110 is then continuously pumped through connected housings 10 for second time interval T2. Interval T2 may have a duration that is the same as, or that is shorter or longer than, the duration of interval T1. During interval T2, degassed ER fluid 110 flows from manifold 117 into and through each connected housing 10 in a reverse direction relative to the flow during interval T1. Recovered ER fluid 110 from each of the housings 10 again flows into manifold 124 and is driven by pump 131 back to reservoir 101 and gas remover 302. Gas remover 302 again removes bubbles and provides degassed ER fluid 110 at the outlet 392 of reservoir 101. During a portion of interval T2, and as shown in FIG. 8D, connected housings 10 may again be inverted in the vertical plane.

Figure 8E:
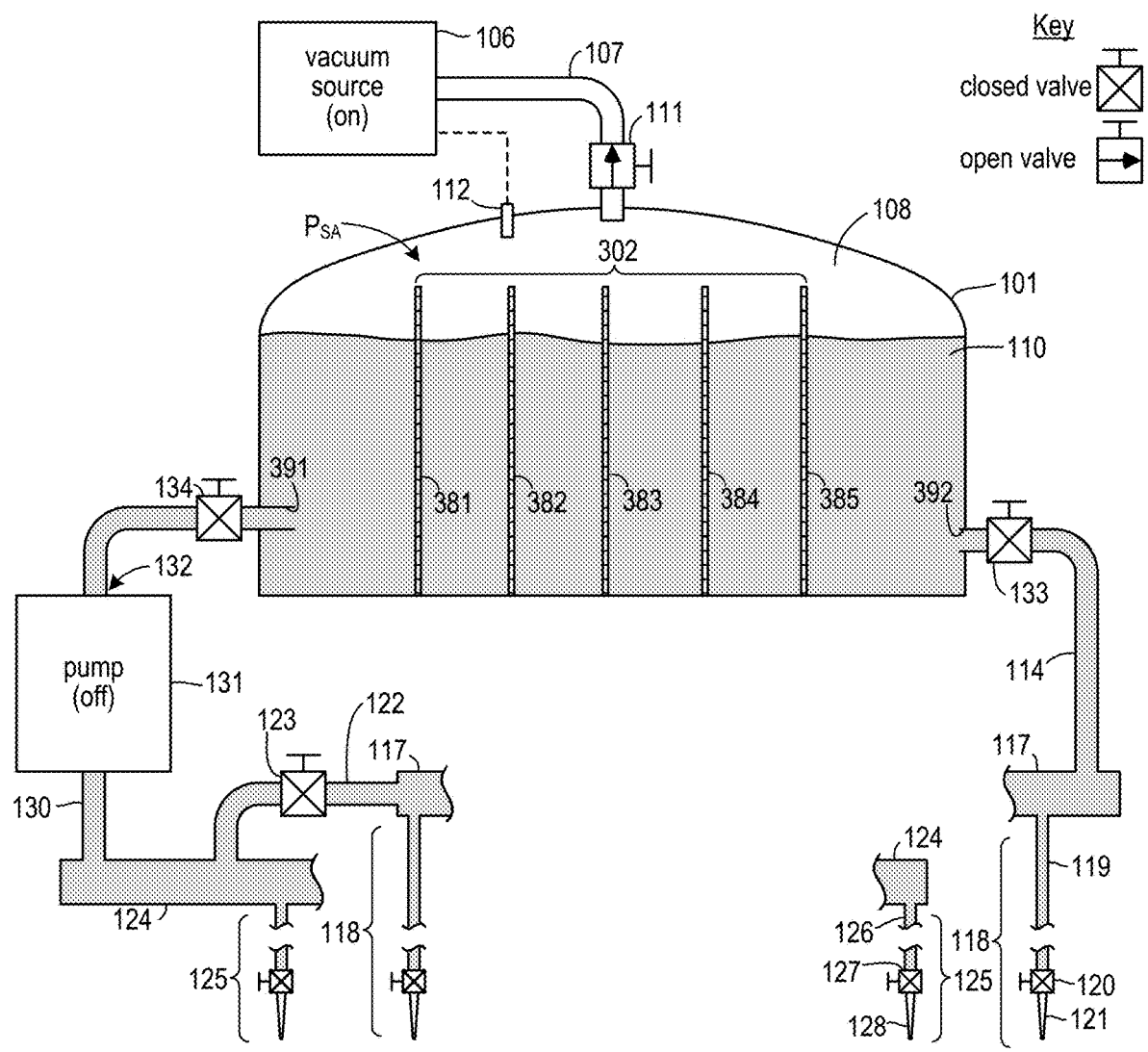

After interval T2, bypass valve 123 is opened and the housings are removed from system 300. As each housing is removed, valves 120 and 127 corresponding to the fittings 121 and 128 removed from that housing are closed. The inlets and outlets of each removed housing may then be sealed by, e.g., RF welding across each sprue. Additional series of the operations of FIGS. 8A through 8D (including initial connection and filling operations similar to those of FIGS. 4A and 4B) may then be performed for additional sets of housings 10. After removal of the housings at the end of a final series of those operations, and as shown in FIG. 8E, pump 131 is turned off and valves 134 and 133 are closed. Additional ER fluid 110 may be added to reservoir 101 through a feed opening (not shown). After sealing that feed opening, valve 111 is opened and vacuum source 106 is turned on. Headspace 108 is then maintained at $P_{SA}$ during a third interval T3. In some embodiments, interval T3 may have a duration of at least 30 minutes, at least 1 hour, or at least 4 hours. At the conclusion of interval T3, vacuum source 106 is turned off, valve 111 is closed, and system 300 is then available to perform further series of the operations of FIG. 8A through 8D.

In some embodiments, a system may be configured to treat ER fluid with a vacuum while that system is pumping ER fluid through a gas remover and through ER fluid housings. FIGS. 9A through 9E show operations in a system 400 according to one such embodiment. System 400 is similar to system 100, but with several additional components added. In addition to reservoir 101, system 400 includes a second reservoir 401. Reservoirs 101 and 401 are connected by a transfer conduit 495. A valve 496 in conduit 495 is actuatable by a solenoid 497 to open and close conduit 495. Reservoir 401 is connected by a conduit 493 to an input of a second pump 488, with conduit 492 connecting the output of pump 488 to manifold 117. Valve 494, as well as valves 434 (replacing valve 134 of system 100) and 411 (replacing valve 111 of system 100) are actuatable by respective solenoids 485, 487, and 486. A computer operated controller 498 is configured to control solenoids 485 through 487 and 497, and is further configured to activate and deactivate pump 132, pump 488, and vacuum source 106. Controller 498 may include a processor and memory storing instructions that, when executed by the processor, cause the processor to perform operations such as are described herein. Controller 498 is also communicatively coupled to a fluid level sensor 490 in reservoir 401. A float 491 of sensor 490 rises and falls with the level of ER fluid 110 in reservoir 110 and outputs a signal, based on the position of float 491, indicative of the level of ER fluid 110 present in reservoir 401. Float-operated fluid level sensors are known in the art.

Manifolds 117 and 124 are similar to manifolds 117 and 124 of previously described embodiments. Manifold 117 includes discharge ports 118 and manifold 124 includes recovery ports 125, although only valves 120 and 127 of ports 118 and 125 are marked in FIGS. 9A through 9E. Other elements of system 400 that are the same as elements of systems 100, 200, and 300 are identified with the same reference numbers used in FIGS. 3A through 4G, and previous descriptions of those elements apply in connection with system 400.

System 400 may be used to perform operations similar to those described in connection with FIGS. 4A through 4F. Unlike system 100, however, system 400 fills connected housings with degassed ER fluid 110 from reservoir 401. Fluid is pumped from reservoir 401 to manifold 117 by pump 488. Recovered ER fluid 110 that is received in manifold 124 is pumped by pump 132 through gas remover 102 and into reservoir 101. At the same time, vacuum source 106 is activated and pressure $P_{SA}$ is maintained within reservoir 101. While ER fluid 110 is being pumped to gas remover 102 and into reservoir 101, and while pressure $P_{SA}$ is being maintained in reservoir 101, valve 496 is closed.

Figure 9A:
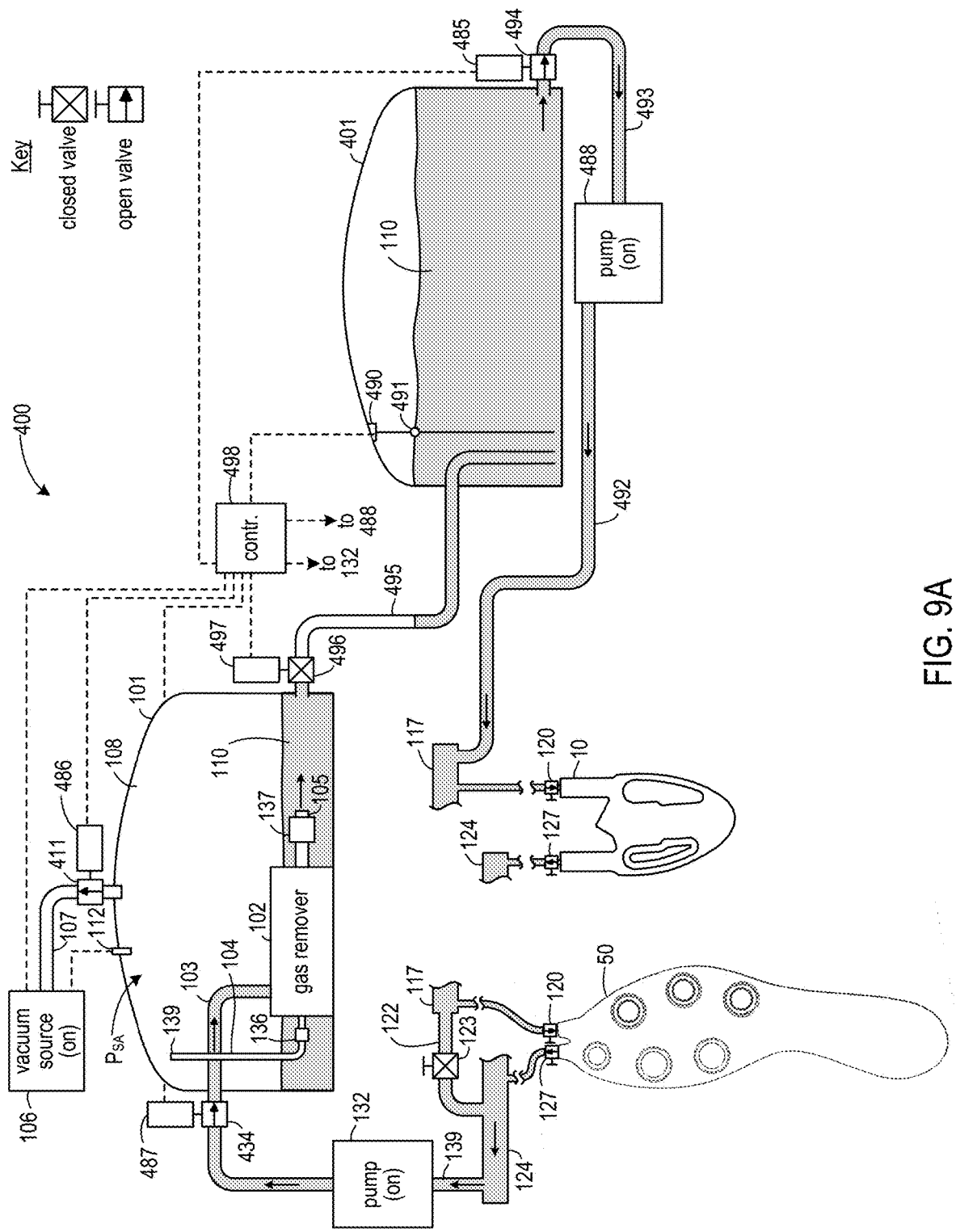
FIGS. 9A through 9E are block diagrams showing a system, and operations of that system, according to yet additional embodiments.
Figure 9B:
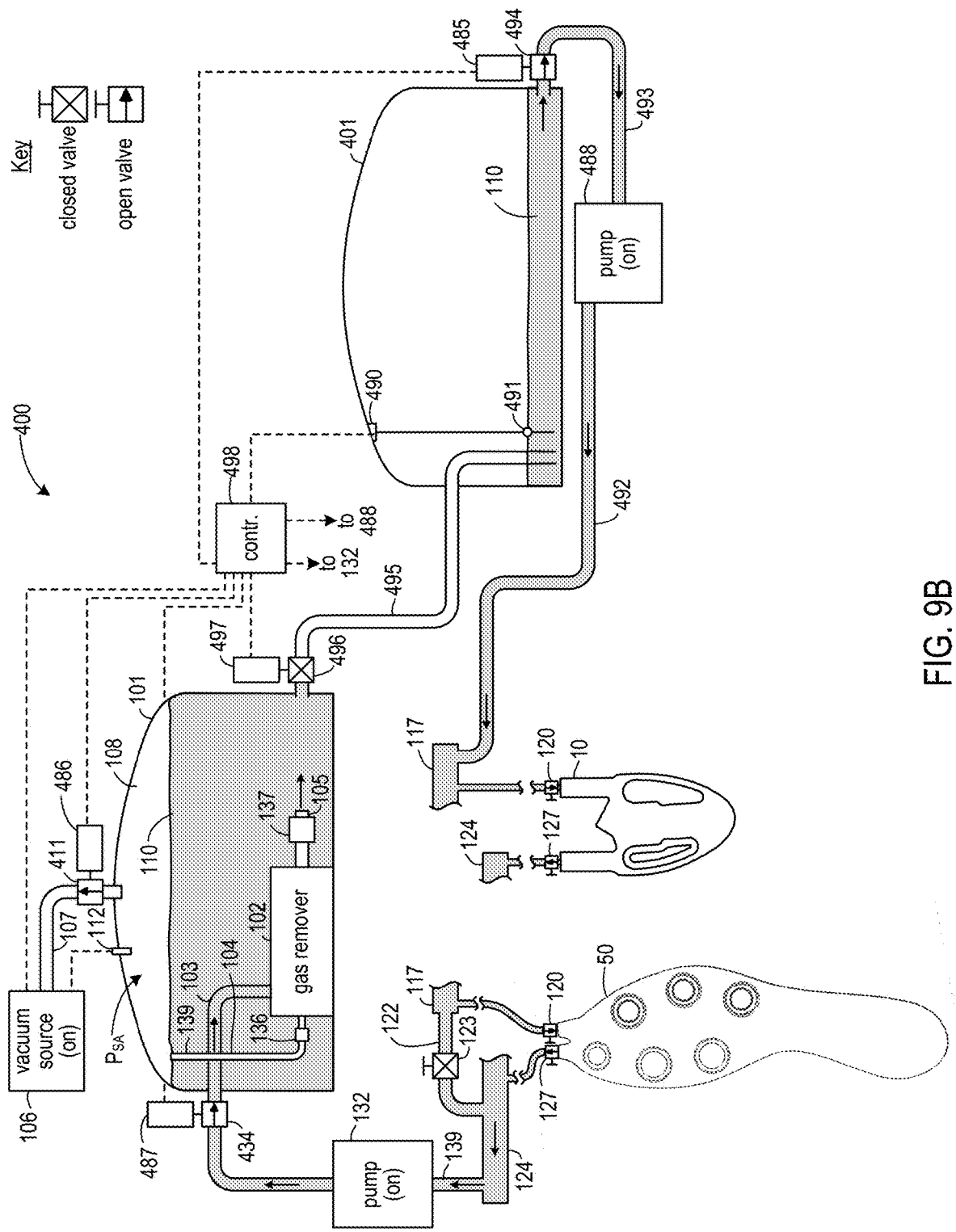
Figure 9C:
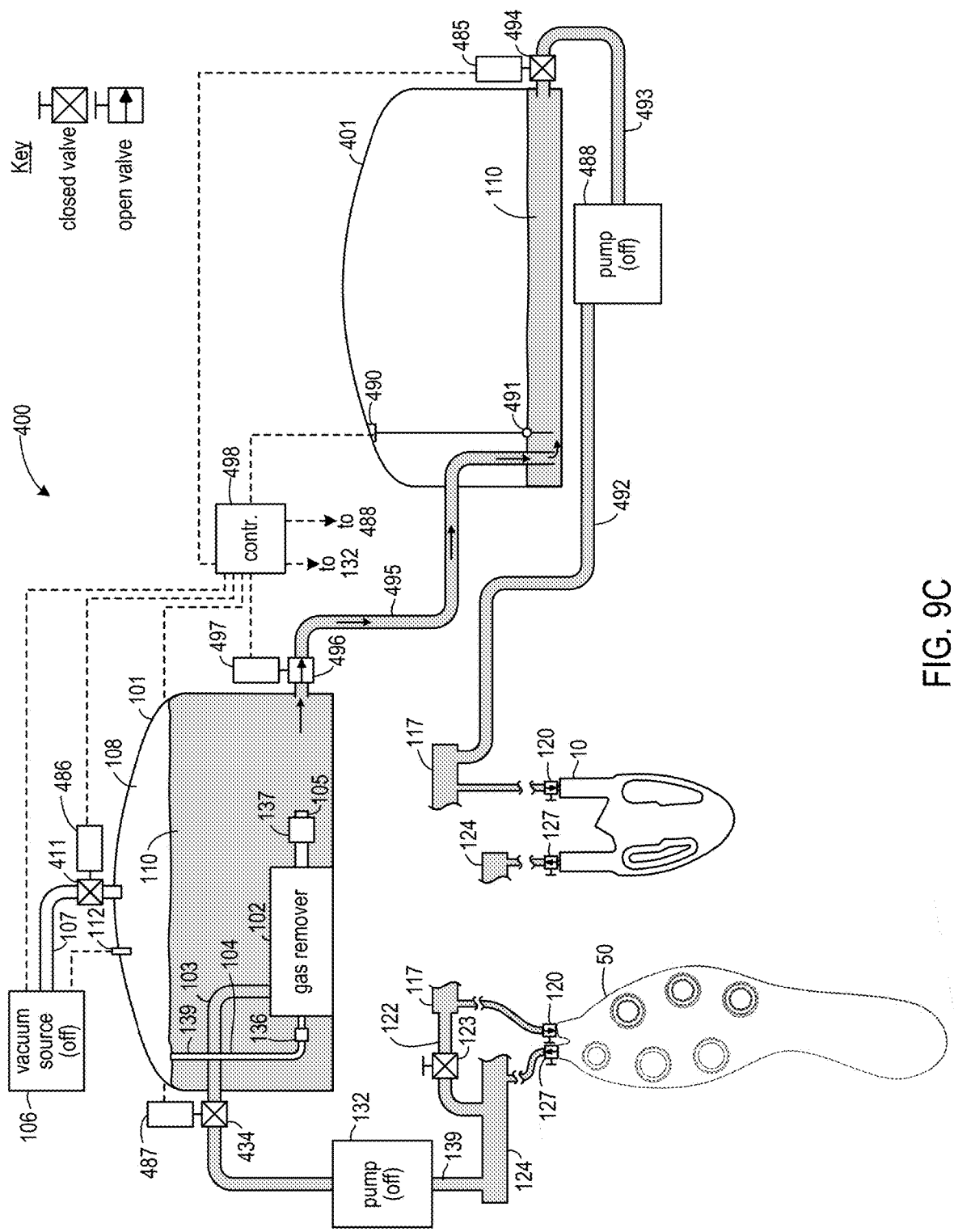

FIG. 9B shows system 400 after multiple series of operations similar to those of FIGS. 4A through 4F have been performed. Reservoir 401 is almost depleted and reservoir 101 is almost full. In response to a signal from sensor 490 indicating that the fluid level within reservoir 401 has dropped to a predetermined level, controller 498 places system 400 into a reservoir-to-reservoir transfer mode. Additional details of this mode are shown in FIG. 9C. Controller 498 has turned off vacuum source 106 and pumps 132 and 488. Controller has closed valves 434, 411, and 494, and has opened valve 496, by actuating the corresponding solenoids. Controller 498 may also cause reservoir 101 to be vented to atmospheric pressure by actuating a solenoid of a separate vent valve (not shown) in reservoir 101. As a result, ER fluid 110 stops flowing between valve 494 and valve 434 through manifolds 117 and 124 and connected housings. Fluid flows from reservoir 101 into reservoir 401. In some embodiments, and as indicated in FIG. 9C, reservoirs 101 and 401 are positioned so that ER fluid 110 may flow by gravity alone. In other embodiments, a separate transfer pump may be interposed in conduit 495 and controlled by controller 498.

Figure 9D:
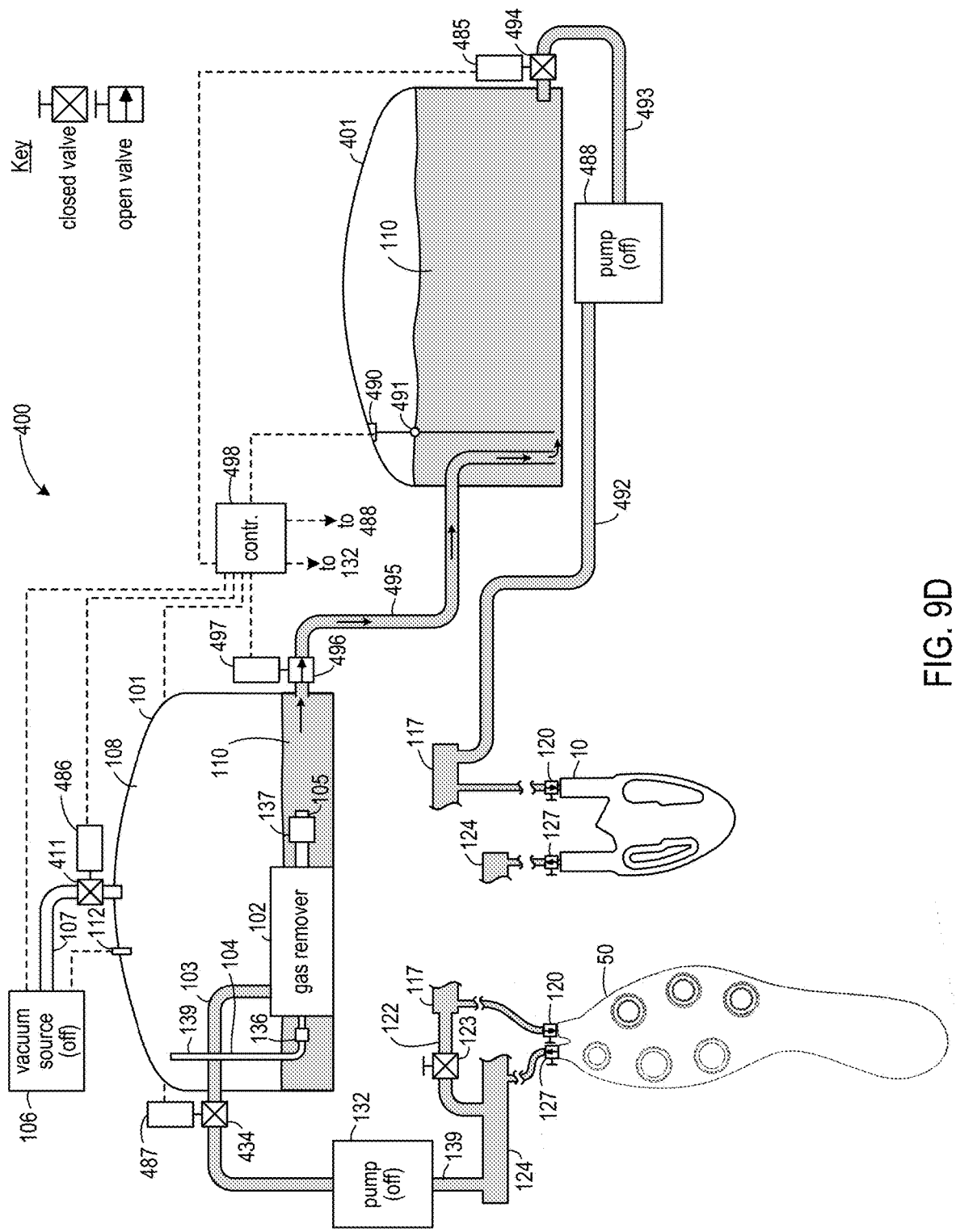
Figure 9E:
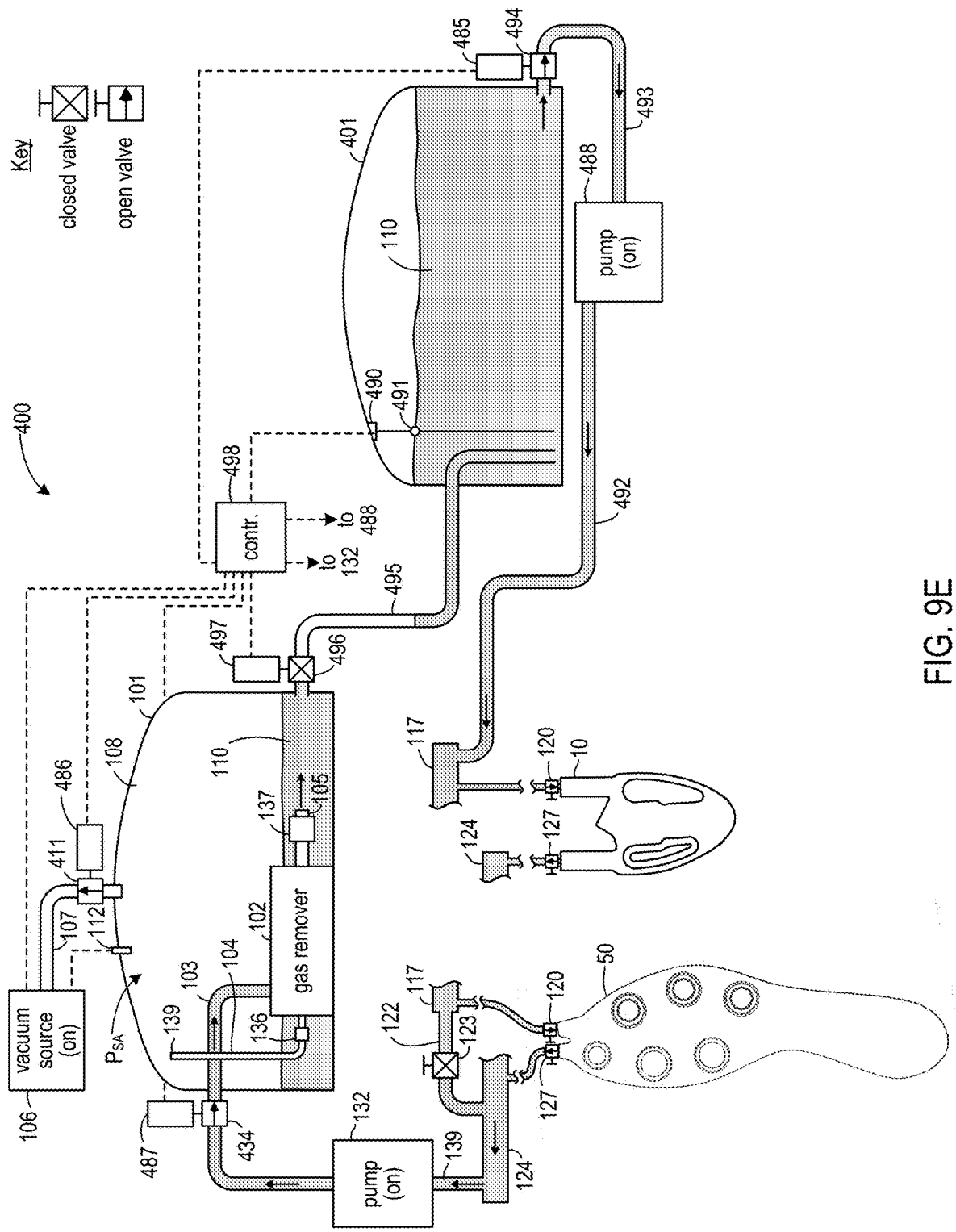

Controller 498 maintains system 400 in the reservoir-to-reservoir fluid transfer mode until the level of ER fluid 110 in reservoir 401 reaches a second predetermined level, as shown in FIG. 9D. In response to receiving a signal from sensor 490 indicating that the second predetermined level is reached, and as shown in FIG. 9E, controller 498 returns system 400 to the filling mode. In particular, controller 498 closes valve 496 and opens valves 434, 412, and 494 by actuating the corresponding solenoids, closes the valve venting reservoir 101 to atmospheric pressure, turns on vacuum source 106, and turns on pumps 132 and 488.

Figure 10A:
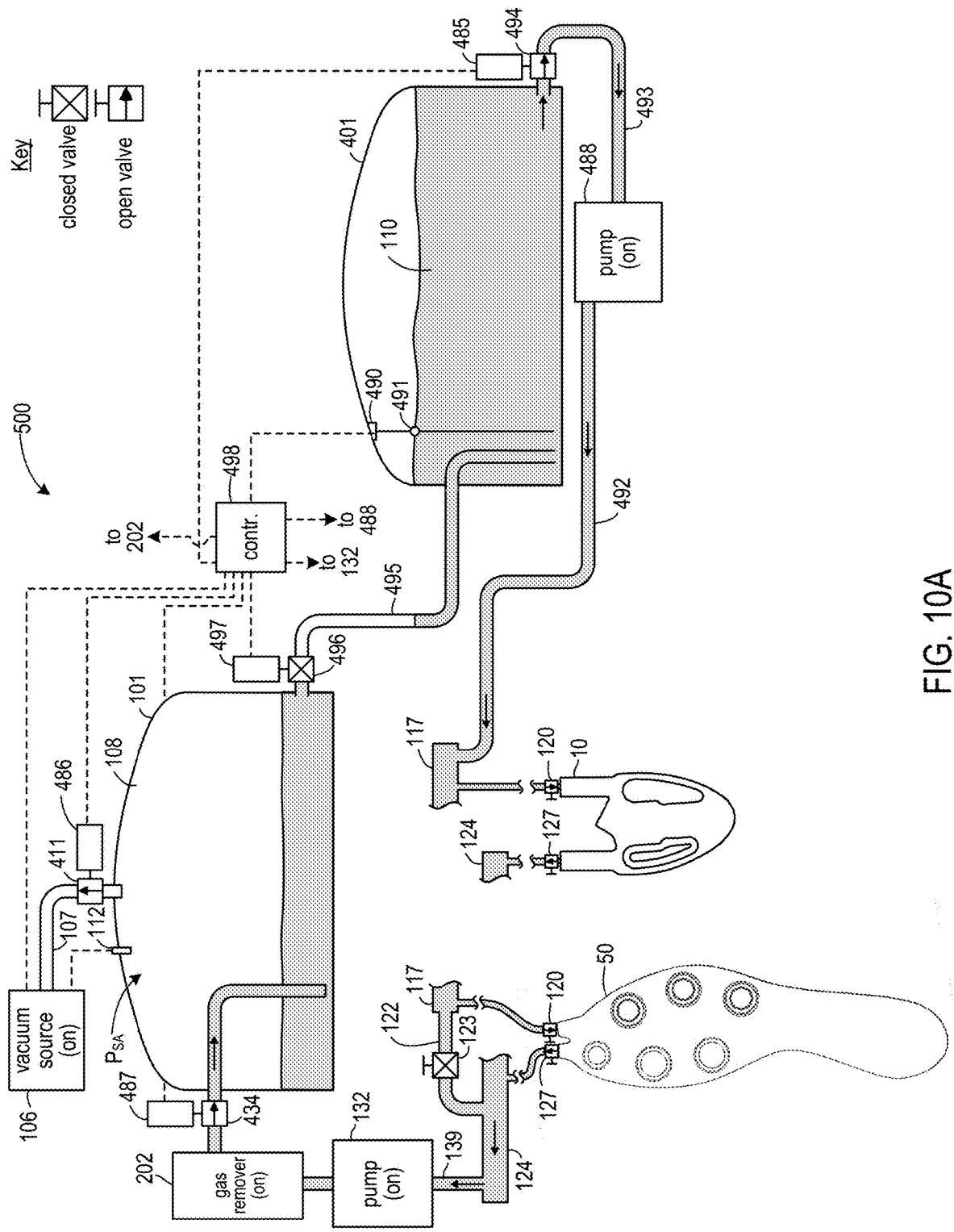
FIGS. 10A through 11B are block diagrams showing systems, and operations of those systems, according to yet further embodiments.
Figure 10B:
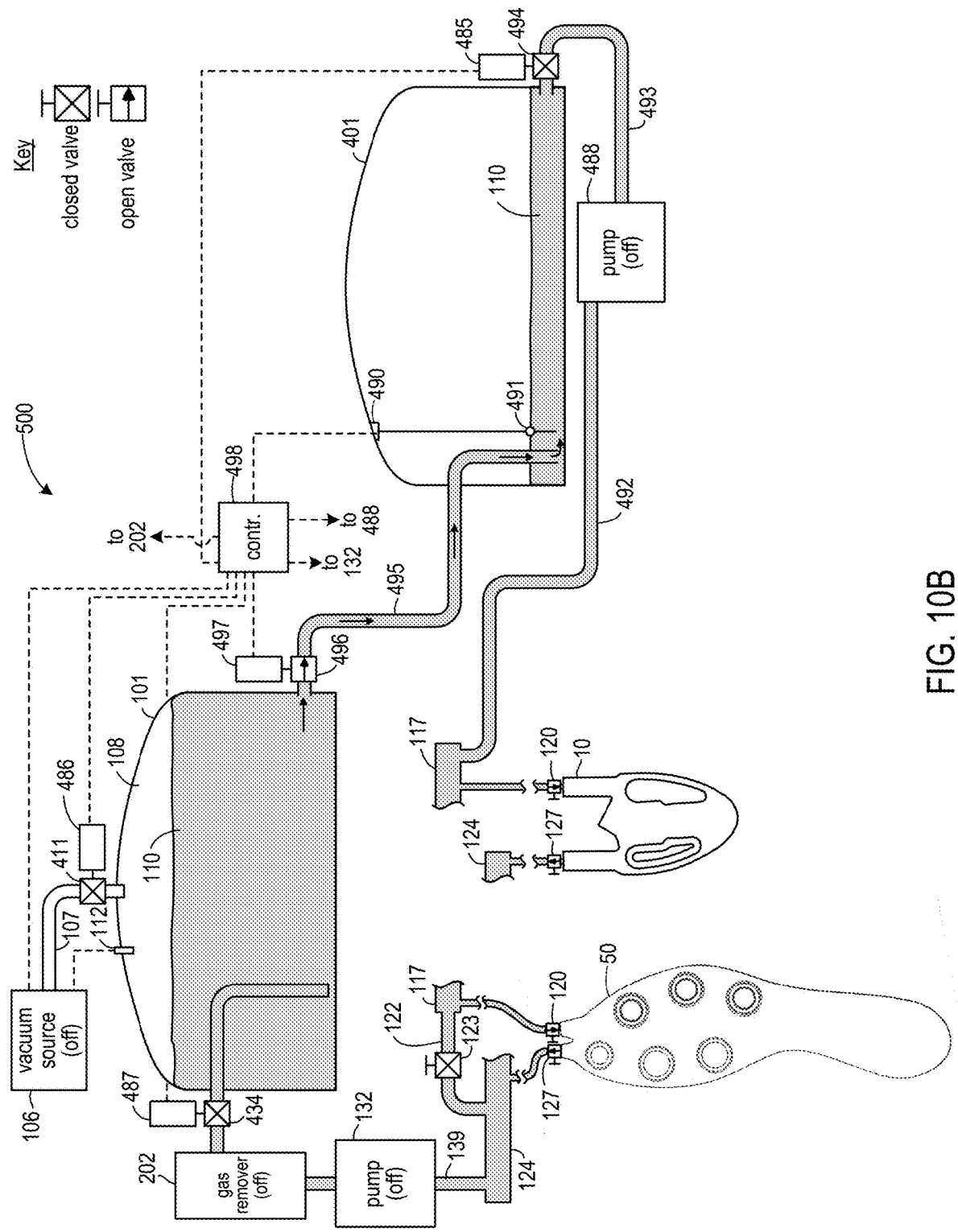

As can be appreciated from the above discussion, system 400 is a modification of system 100 to treat ER fluid with a vacuum while pumping ER fluid through a gas remover and through ER fluid housings. This modification includes, e.g., addition of a second reservoir to receive degassed ER fluid from the first reservoir when the level of degassed ER fluid within the second reservoir drops to a certain level. As can be appreciated by persons skilled in the art, after such persons have the benefit of the teachings provided herein, systems 200 and 300 could be modified in a similar manner. FIGS. 10A and 10B are block diagrams of a system 500 reflecting such a modification of system 200. FIG. 10A shows system 500 in a normal operating mode while pumping ER fluid 110 through connected housings. FIG. 10B shows system 500 in a reservoir-to-reservoir transfer mode. System 500 operates in a manner similar to that described for system 400, except that controller 498 also deactivates gas remover 202 when in the reservoir-to-reservoir transfer mode.

Figure 11A:
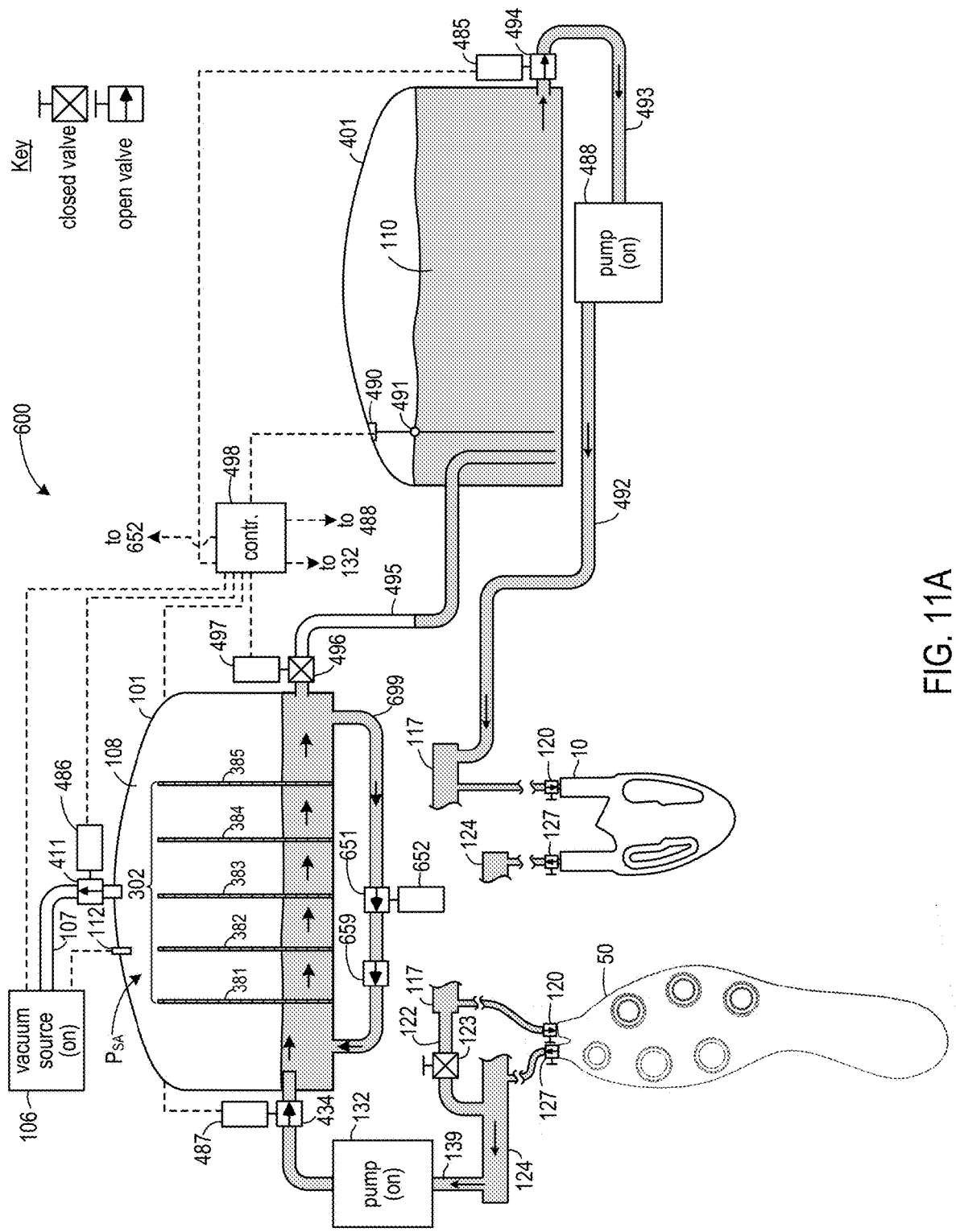
Figure 11B:
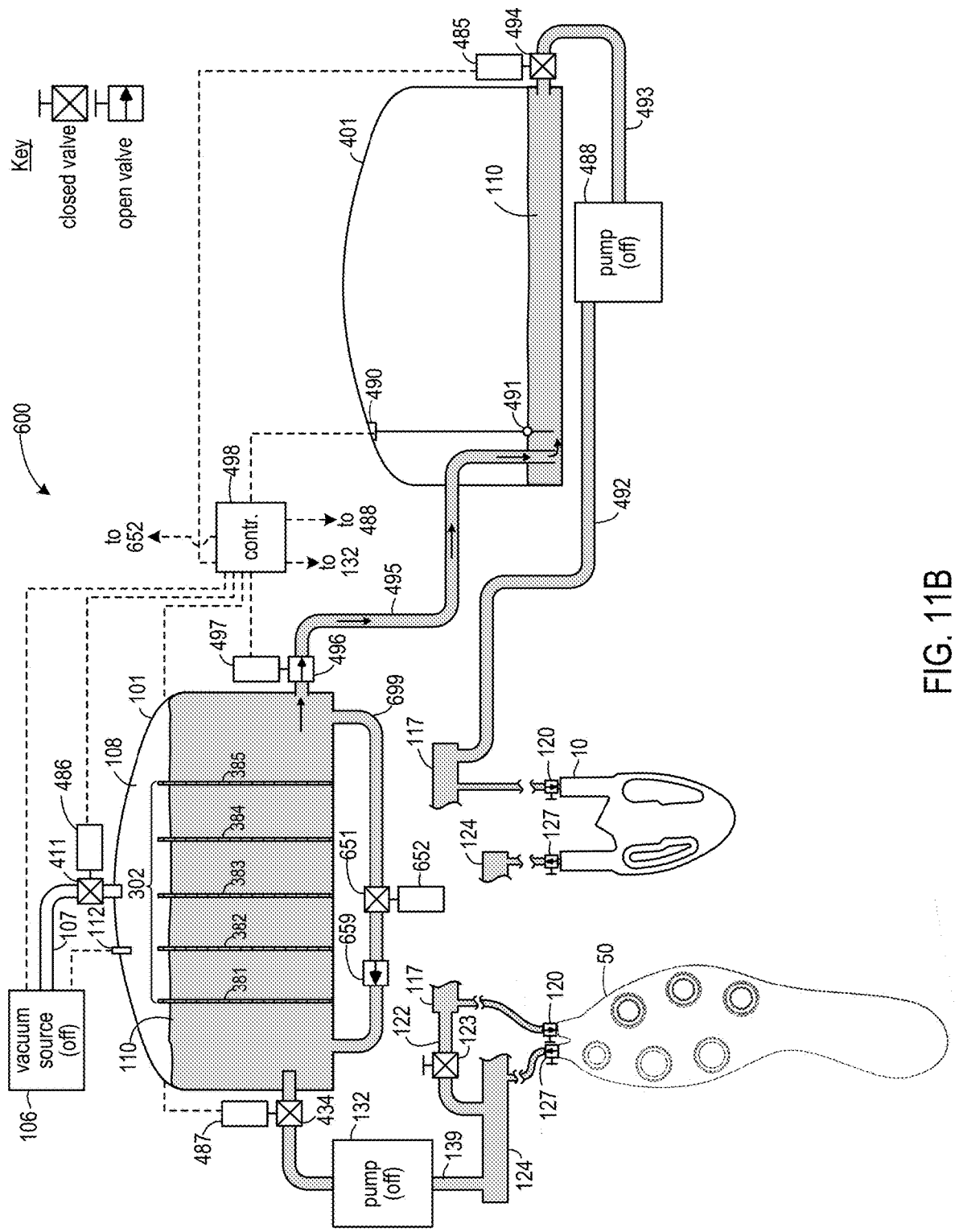

FIGS. 11A and 11B are block diagrams of a system 600 reflecting a modification of system 300. FIG. 11A shows system 600 in a normal operating mode while pumping ER fluid 110 through connected housings. FIG. 11B shows system 600 in a reservoir-to-reservoir transfer mode. System 600 operates in a manner similar to that described for system 400, except that controller 498 also opens a valve 651 in a conduit 699 when in normal operating mode so that ER fluid 110 will flow across filters 381 through 385. Controller 498 opens and closes valve 651 by actuating a corresponding solenoid 652. Conduit 699 may include a one-way valve 659 to prevent flow through conduit 699 in the wrong direction. In some embodiments, conduit 699 may include an additional pump (not shown) to help fluid flow in the proper direction. If included, such a pump could be turned on by controller 498 when valve 651 is open and turned off by controller 498 when valve 651 is closed. In some embodiments, conduit 699 may be omitted.

Embodiments include, without limitation, the following variations on the systems and methods described above.

In some embodiments employing a centrifugal flow bubble remover such as that described in connection with FIGS. 3A and 3C, the bubble remover may be located outside of a reservoir.

In some embodiments, a fluid system may include multiple different types of gas removers that operate simultaneously. Such embodiments include, without limitation, systems using a centrifugal flow bubbler remover and an ultrasonic bubble remover, systems using a centrifugal flow bubble remover and one or more filters, systems using an ultrasonic bubble remover and one or more filters, and systems using a centrifugal flow bubbler remover, an ultrasonic bubble remover, and one or more filters.

In some embodiments, one or more of the operations described in above may be omitted. As one example, pumping ER fluid through housings in a reversed direction may be omitted. As another example, inverting housings may be omitted, or housings may only be inverted a single time (e.g., inverted during flow in one direction through housings, but not when flow through reverse direction is performed). The order of certain operations described above may be varied.

In some embodiments, vacuum operations such as those described in connection with FIGS. 4G, 6E, and 8E may not be performed.

In some embodiments, a system may lack a bypass between manifolds. In some such embodiments, a pump is only turned on when all housings are connected and ER fluid is able to flow through those connected housings. Prior to initial connection of those housings to such a system, those housings may be separately filled from another source of ER fluid.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. Any and all combinations, subcombinations and permutations of features from herein-described embodiments are the within the scope of the invention.

The invention claimed is:

1. A method comprising:
connecting a housing to a fluid system containing an electrorheological fluid, the fluid system comprising a reservoir of the electrorheological fluid and a gas remover, wherein the connecting the housing to the fluid system connects an interior volume of the housing to an interior volume of the fluid system;
connecting an output manifold and a recovery manifold in fluid communication with the reservoir;
after connecting the housing to the fluid system, pumping the electrorheological fluid through the reservoir while pumping the electrorheological fluid through the housing and through the gas remover; and
after pumping the electrorheological fluid through the housing and through the gas remover, disconnecting the housing from the fluid system,
wherein when the housing is connected to the fluid system, the electrorheological fluid is pumped continuously through the housing and the gas remover to remove bubbles from the electrorheological fluid while in motion.

2. The method of claim 1, wherein the gas remover comprises one or more of a circumferential flow bubble remover, an ultrasonic bubble remover, or a mesh filter.

3. The method of claim 1, wherein connecting the housing to the fluid system places the interior volume of the housing in fluid communication with the gas remover.

4. The method of claim 1, comprising:
exposing the reservoir to a vacuum while pumping the electrorheological fluid through the reservoir.

5. The method of claim 1, wherein the reservoir has an internal volume greater than an internal volume of the housing and contains a larger volume of the electrorheological fluid than the housing.

6. The method of claim 1, wherein the gas remover is located within the reservoir.

7. The method of claim 1, wherein the housing comprises an inlet and an outlet, and wherein pumping the electrorheological fluid through the housing comprises
performing a first pumping of the electrorheological fluid through the housing from the inlet to the outlet, and
performing a second pumping of the electrorheological fluid through the housing from the outlet to the inlet.

8. The method of claim 1, wherein pumping the electrorheological fluid through the housing comprises
performing a first pumping of the electrorheological fluid through the housing while the housing is in a first orientation,
after the first pumping, placing the housing in a second orientation, and
performing a second pumping of the electrorheological fluid through the housing in the second orientation.

9. The method of claim 8, wherein the second orientation comprises a rotation in a vertical plane from the first orientation.

10. The method of claim 9, wherein the housing comprises an inlet and an outlet, and wherein pumping the electrorheological fluid through the housing comprises
performing a third pumping of the electrorheological fluid through the housing from the inlet to the outlet, and
performing a fourth pumping of the electrorheological fluid through the housing from the outlet to the inlet.

11. The method of claim 1, comprising:

connecting additional housings to the fluid system, and wherein the pumping the electrorheological fluid through the housing and through the gas remover comprises simultaneously pumping the electrorheological fluid through the housing and through the additional housings.

12. The method of claim 1, wherein the housing is a polymeric housing, and the interior volume of the housing comprises first and second chambers connected by a channel, and the housing comprises first and second electrodes, each of the first and second electrodes coinciding with at least a portion of the channel, and wherein the first and second electrodes are not in electrical contact with one another.

\* \* \* \* \*